United States Patent
Jones et al.

(10) Patent No.: US 9,923,962 B2
(45) Date of Patent: Mar. 20, 2018

(54) TECHNIQUES AND SYSTEMS FOR SUPPORTING PODCASTING

(71) Applicant: Apple Inc., Cupertino, CA (US)

(72) Inventors: Anne Jones, Emerald Hills, CA (US);
Thomas Dowdy, Sunnyvale, CA (US);
Jeffrey Robbin, Los Altos, CA (US);
Mike Wiese, Cupertino, CA (US);
Stephen Davis, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/238,342

(22) Filed: Aug. 16, 2016

(65) Prior Publication Data

US 2017/0006090 A1  Jan. 5, 2017

Related U.S. Application Data

(63) Continuation of application No. 14/820,031, filed on Aug. 6, 2015, now Pat. No. 9,467,504, which is a (Continued)

(51) Int. Cl.
*G06K 5/00* (2006.01)
*H04L 29/08* (2006.01)
(Continued)

(52) U.S. Cl.
CPC ............ *H04L 67/104* (2013.01); *G06F 3/048* (2013.01); *G06F 17/30899* (2013.01);
(Continued)

(58) Field of Classification Search
CPC .. G06F 3/048; G06F 17/30899; H04L 67/104; H04L 51/046; H04L 65/4084;
(Continued)

(56) References Cited

U.S. PATENT DOCUMENTS 5,793,980 A  8/1998  Glaser et al.
6,597,891 B2  7/2003  Tantawy et al.
(Continued)

FOREIGN PATENT DOCUMENTS

| JP | 2002334266 | 11/2002 |
| JP | 2005507130 | 3/2005 |
| WO | WO 2001/025948 | 4/2001 |

OTHER PUBLICATIONS

"Armangil's podcatcher," Retrieved from the Internet on Aug. 31, 2006, at URL http://podcatcher.rubyforge.org, pp. 1-4.
(Continued)

*Primary Examiner* — Karl D Frech
(74) *Attorney, Agent, or Firm* — Fish & Richardson P.C.

(57) ABSTRACT

Improved podcasts and techniques that facilitate their use are disclosed. The improved techniques can pertain to creating, publishing, hosting, accessing, subscribing, managing, transferring, and/or playing podcasts. According to one aspect, a client application can subscribe to podcasts and then automatically monitor the podcasts for updates to be downloaded. In the event that user interest in a podcast becomes inadequate, downloading of further updates can be restricted. According to another aspect, a podcast can be subscribed to through use of a portable subscription file. According to still another aspect, podcast feeds can be enhanced to include segment elements and other metadata.

24 Claims, 23 Drawing Sheets

Related U.S. Application Data continuation of application No. 14/029,436, filed on Sep. 17, 2013, now Pat. No. 9,104,289, which is a continuation of application No. 13/552,390, filed on Jul. 18, 2012, now Pat. No. 8,646,687, which is a continuation of application No. 13/207,361, filed on Aug. 10, 2011, now Pat. No. 8,245,924, which is a continuation of application No. 12/477,820, filed on Jun. 3, 2009, now Pat. No. 8,020,762, which is a continuation of application No. 11/166,331, filed on Jun. 25, 2005, now Pat. No. 7,686,215.

(60) Provisional application No. 60/683,056, filed on May 21, 2005.

(51) Int. Cl.
| | | |
|---|---|---|
| G06F 17/30 | (2006.01) | |
| G06F 3/048 | (2013.01) | |
| H04L 29/06 | (2006.01) | |
| H04L 12/58 | (2006.01) | |

(52) U.S. Cl.
CPC ........ *H04L 51/046* (2013.01); *H04L 65/4084* (2013.01); *H04L 65/60* (2013.01); *H04L 67/06* (2013.01); *H04L 67/10* (2013.01); *H04L 67/26* (2013.01)

(58) Field of Classification Search
CPC ......... H04L 65/60; H04L 67/06; H04L 67/10; H04L 67/26
USPC .............. 235/380, 382, 375, 472.01, 472.02, 235/472.03
See application file for complete search history.

(56) References Cited

U.S. PATENT DOCUMENTS

| | | | |
|---|---|---|---|
| 6,782,552 | B1 | 8/2004 | Stiegler et al. |
| 6,928,433 | B2 | 8/2005 | Goodman et al. |
| 7,020,704 | B1 | 3/2006 | Lipscomb et al. |
| 7,686,215 | B2 | 3/2010 | Jones et al. |
| 7,730,509 | B2 * | 6/2010 | Boulet .................. G06Q 30/02 705/14.53 |
| 7,788,248 | B2 | 8/2010 | Forstal et al. |
| 8,020,762 | B2 | 9/2011 | Jones et al. |
| 8,245,924 | B2 | 8/2012 | Jones et al. |
| 8,646,687 | B2 | 2/2014 | Jones et al. |
| 2003/0079038 | A1 | 4/2003 | Robbin et al. |
| 2003/0105589 | A1 | 6/2003 | Liu et al. |
| 2003/0149574 | A1 | 8/2003 | Rudman |
| 2003/0163823 | A1 | 8/2003 | Logan et al. |
| 2003/0182139 | A1 | 9/2003 | Harris et al. |
| 2004/0088328 | A1 | 5/2004 | Cook et al. |
| 2005/0065912 | A1 | 3/2005 | Cafrelli et al. |
| 2005/0071780 | A1 | 3/2005 | Muller et al. |
| 2005/0091107 | A1 | 4/2005 | Blum |
| 2005/0108754 | A1 | 5/2005 | Carhart et al. |
| 2006/0129907 | A1 | 6/2006 | Volk et al. |
| 2006/0190616 | A1 | 8/2006 | Mayerhofer et al. |
| 2006/0248209 | A1 | 11/2006 | Chiu et al. |
| 2014/0026049 | A1 | 1/2014 | Jones et al. |

OTHER PUBLICATIONS

"Desktop improvement committee, Next move for better use of Fedora Core, Desktop improvement plan 2005," Linux magazine, ASCII Co. Ltd., Mar. 1, 2005, vol. 7, No. 3, pp. 20-31.
"iPod User's Guide," XP002401535, Retrieved from Internet on Oct. 29, 2006 at URL http://manuals.info.apple.com/en/iPod_OriginalUserGuide.pdf, pp. 1-34.
"iPodder-the cross-platform podcast receiver," Retrieved from the Internet on May 20, 2005, XP002409911, at URL http://web.archive.org/web/20050520011817/http://sourceforge.net/project/showfiles.php?group_id=118306&package_id=131038&release_id=328481 , pp. 1-3.
"Podcast Directory (iPodderX)," retrieved from the internet:http://web.archive.org/web/2004 1 031090936/http://ipodderx.com/directory.
"Podcatcher—A podcast download tool," Retrieved from the Internet on May 7, 2005, XP002397123, at URL http://groups.google.de/group/fm.announce/browse_thread/thread/4ea78662d64617392d6658621b490071?lnk=st&q=rnum=1&hl=de#2d6658621d490071 (the whole document).
"Reading blog, recording program, etc., how to make use of iPod other than for music," Click, NIKKEI BP, May 12, 2005, vol. 12, No. 6, pp. 87-89.
"What is iPodderX," Retrieved from the Internet on Oct. 31, 2004, XP002401120, at URL http://web.archive.org/web/20041031000450/http://ipodderx.com, pp. 1-2.
Adam Curry, ipodder.org screen shots, Sep. 21, 2004.
Anonumous, "What is iPodderX," retrieved from the Internet, Oct. 31, 2004, pp. 1-2.
Chorianopoulos et al., "Cross Media Digital Rights Management for Online Music Stores," Automated Production of Cross Media Content for Multi-Channel Distribution, 2005. First International Conference on Florence, Italy 30-02 Nov. 2005, Piscataway, NJ, USA, IEEE, XP010892461, Nov. 30, 2005, pp. 257-260.
Hammersley, Ben, "Content Syndication with RSS," O'Reilly, Mar. 2003.
iPodder 1.1 for Windows Manual, published Jan. 11, 2005, 8 pages.
Nayota Ito, "Let's Begin RSS" UNIX User vol. 13, No. 3, Japan, Softbank Publishing Corp., Mar. 1, 2004, vol. 13, pp. 80-90.
Sandler et al., "FeedTree: Sharing Web Micronews with Peer-to-Peer Event Notification," Peer-to-Peer Systems IV $4^{th}$ International Workshop, IPTPS 2005, Feb. 25, 2005, pp. 141-151.
Examination Report dated Mar. 14, 2008 from European Application No. 06759342.6.
Examination Report dated Mar. 14, 2008 from European Application No. 06759421.8.
Examination Report from corresponding Application No. EP06759421.8-1952, dated Oct. 2, 2013; pp. 1-6.
Examination Report from Indian Patent Application No. 4867/KOLNP/2007, dated Mar. 12, 2014, 3 pages.
Examiner Tan Mingmin, First Office Action in CN201210180777.1, dated Nov. 4, 2014, 10 pages.
Final Office Action dated Dec. 23, 2010 from U.S. Appl. No. 12/488,820.
International Search Report dated Dec. 19, 2006 from International Application No. PCT/US2006/017955.
Notice of Allowance dated May 13, 2011 from U.S. Appl. No. 12/488,820.
Notice of Grounds of Rejection dated May 13, 2011 from Japanese Application No. 2008-512349.
Office Action dated Aug. 1, 2008 from U.S. Appl. No. 11/166,332.
Office Action dated Aug. 14, 2009 from Chinese Patent Application No. 200680021898.4.
Office Action dated Aug. 5, 2009 from U.S. Appl. No. 11/166,332.
Office Action dated Aug. 6, 2010 from U.S. Appl. No. 12/488,820.
Office Action dated Dec. 10, 2007 from U.S. Appl. No. 11/166,333.
Office Action dated Feb. 19, 2009 in U.S. Appl. No. 11/166,333.
Office Action dated Feb. 26, 2008 from U.S. Appl. No. 11/166,331.
Office Action dated Feb. 28, 2011 from Japanese Application No. 2008-512342.
Office Action dated Jan. 22, 2010 from U.S. Appl. No. 11/166,332.
Office Action dated Mar. 1, 2010 from U.S. Appl. No. 11/166,333.
Office Action dated May 15, 2009 from Chinese Patent Application No. 200680022102.7.
Office Action dated May 3, 2007 from U.S. Appl. No. 11/166,333.
Office Action dated May 8, 2009 from U.S. Appl. No. 11/166,332.
Office Action dated Nov. 22, 2006 from U.S. Appl. No. 11/166,333.
Office Action dated Nov. 25, 2008 in U.S. Appl. No. 11/166,332.
Office Action dated Nov. 3, 2009 from European Application No. 06759421.8.

(56) References Cited

OTHER PUBLICATIONS

Office Action dated Nov. 4, 2009 from European Application No. 06759342.6.
Office Action in Ex Parte Reexamination for corresponding U.S. Appl. No. 90/012,766, dated Aug. 2, 2013; pp. 1-67.
Partial Search Report dated Oct. 20, 2006 from International Application No. PCT/US2006/017957.
Partial Search Report dated Oct. 20, 2006 from International PCT/US2006/017768.
Partial Search Report dated Sep. 18, 2006 from International Application No. PCT/US2006/017955.
Search Report dated Dec. 19, 2006 from International Application No. PCT/US2006/017957.
Search Report dated Dec. 19, 2006 from International PCT/US2006/017768.
Search Report dated Dec. 21, 2006 from International Application No. PCT/US20061017957.
U.S. Pat. No. 8,245,924, Request for Re-examination dated Jan. 14, 2013, 155 pages.
Written Opinion dated Dec. 19, 2006 from International Application No. PCT/US2006/017957.
Written Opinion dated Dec. 19, 2006 from International Application No. PCT/US2006/017955.
Written Opinion dated Dec. 19, 2006 from International Application No. PCT/US2006/017768.
European Extended Search Report for Application No. 16190910.6, dated Feb. 9, 2017, 6 pages.
'web.archive.org' [online]. "OPML—Wikipedia, the free encyclopedia," May 18, 2005, [Retrieved on Jan. 31, 2017]. Retrieved from the Internet: URL<URL:http://web.archive.org/web/20050518073817/http://en.wikipedia.org/wiki/OPML> 1-2 pages.
'web.archive.org' [online]. "Pixelated Software," Apr. 28, 2005, [Retrieved on Jan. 31, 2017]. Retrieved from Internet: URL<URL:http://web.archive.org/web/20050428065636/http://www.pixelatedsoftware.com/products/inews/index.php#breakingnews> 3 pages.

\* cited by examiner

FIG. 8E

TECHNIQUES AND SYSTEMS FOR SUPPORTING PODCASTING

CROSS-REFERENCE TO RELATED APPLICATIONS

This application is a continuation of and claims priority to co-pending U.S. patent application Ser. No. 14/820,031, filed Aug. 16, 2015, entitled "TECHNIQUES AND SYSTEMS FOR SUPPORTING PODCASTING," which in turn claims priority to U.S. patent application Ser. No. 14/029,436, filed Sep. 17, 2013, entitled "TECHNIQUES AND SYSTEMS FOR SUPPORTING PODCASTING," which issued on Aug. 11, 2015 as U.S. Pat. No. 9,104,289, which in turn claims priority to U.S. application Ser. No. 13/552,390, filed Jul. 18, 2012, entitled "TECHNIQUES AND SYSTEMS FOR SUPPORTING PODCASTING," which issued on Feb. 11, 2014 as U.S. Pat. No. 8,646,687, which in turn claims priority to U.S. patent application Ser. No. 13/207,361, filed Aug. 10, 2011, entitled "TECHNIQUES AND SYSTEMS FOR SUPPORTING PODCASTING," which issued on Aug. 21, 2012 as U.S. Pat. No. 8,245,924, which in turn claims priority to U.S. patent application Ser. No. 12/477,820, filed Jun. 3, 2009, entitled "TECHNIQUES AND SYSTEMS FOR SUPPORTING PODCASTING," which issued on Sep. 20, 2011 as U.S. Pat. No. 8,020,762, which in turn claims priority to U.S. patent application Ser. No. 11/166,331, filed Jun. 25, 2005, entitled "TECHNIQUES AND SYSTEMS FOR SUPPORTING PODCASTING," which issued on Mar. 30, 2010 as U.S. Pat. No. 7,686,215, which in turn claims priority to U.S. Provisional Patent Application No. 60/683,056, filed May 21, 2005, and entitled "TECHNIQUES AND SYSTEMS FOR SUPPORTING PODCASTING," each of the forgoing applications are hereby incorporated by reference.

This application is related to U.S. patent application Ser. No. 11/166,333, filed Jun. 25, 2005, and entitled "UTILIZATION OF PODCASTS ON PORTABLE MEDIA DEVICES," now abandoned, which is hereby incorporated by reference and U.S. patent application Ser. No. 11/166,332, filed Jun. 25, 2005, and entitled "ACQUISITION, MANAGEMENT AND SYNCHRONIZATION OF PODCASTS," now abandoned, which is hereby incorporated by reference.

BACKGROUND OF THE INVENTION

Field of the Invention

The present invention relates to podcasts and, more particularly, to acquiring and playing podcasts on a portable media device.

Description of the Related Art

A media player stores media assets, such as audio tracks, that can be played or displayed on the media player. One example of a portable media player is the iPod® media player, which is available from Apple Computer, Inc. of Cupertino, Calif. Often, a media acquires its media assets from a host computer that serves to enable a user to manage media assets. In managing media assets, a user can create playlists for audio tracks. These playlists can be created at the host computer. Media assets within the playlists can then be copied to the media player. As an example, the host computer can execute a media management application to create and manage media assets. One example of a media management application is iTunes® produced by Apple Computer, Inc.

Podcasts are typically used to share content from websites. Podcasts are associated with Really Simple Syndication (RSS) feeds which use a lightweight XML format. A podcast can be organized into episodes much like a radio or television program. An interested person can subscribe to receive podcast episodes that are subsequently published. This is achieved by the interested person using their computer to access a podcast website that hosts the RSS feed. The interested person can then subscribe the RSS feed such that their computer occasionally re-visits the podcast website to check for any new podcast episodes. Typically, if a new podcast episode is available, it is downloaded to the computer. Thereafter, the interested user can play the podcast episode at their computer in the same manner as other audio files (e.g., MP3 files). A utility program can be used to download the audio files to a portable media player (e.g., MP3 player). One example of such a conventional utility program is "iPodder" which is a small program that runs on one's computer to download audio files to one's portable media player.

Unfortunately, podcasts are conventionally not easily managed on host computer. Podcasts often dynamically change as new episodes are released. Management of such dynamic media assets is complicated. Additionally, to the extent that the host computer desires to support a portable media player, the host computer needs to manage the transfer of podcast data to the portable media player.

Thus, there is a need for techniques to manage and use podcasts on computers.

SUMMARY OF THE INVENTION

The invention pertains to improved podcasts and techniques that facilitate their use. The improved techniques can pertain to creating, publishing, hosting, accessing, subscribing, managing, transferring, and/or playing podcasts.

According to one aspect, a client application can subscribe to podcasts and then automatically monitor the podcasts for updates. When updates to the podcasts are available (e.g., new episodes), the updates can be downloaded to the client application. However, in the event that user interest in a podcast becomes inadequate, downloading of further updates can be restricted. According to another aspect, a podcast can be subscribed to through use of a portable subscription file. The portable subscription files are portable and transferable across networks, thereby providing a convenient way to facilitate subscription to podcasts. According to still another aspect, podcast feeds can be enhanced to include segment elements and other metadata. The segment links and time indications can be provided for each of the segments. A client application that presents a podcast to a user can provide an improved graphical use interface through use of the segment elements and other metadata.

The invention can be implemented in numerous ways, including as a method, system, device, apparatus (including graphical user interface), or computer readable medium. Several embodiments of the invention are discussed below.

As a method for subscribing to a podcast, one embodiment of the invention includes at least the acts of: receiving a portable subscription file that is used to facilitate subscribing to the podcast; accessing the portable subscription file to obtain podcast information; and subscribing to the podcast using the podcast information.

As a computer readable medium including at least computer program code for subscribing to a podcast, one embodiment of the invention includes at least: computer program code for receiving a user selection of a portable subscription file that is used to facilitate subscribing to the podcast; computer program code for launching a media management application in response to the user selection; computer program code for parsing the portable subscription file to obtain podcast information; and computer program code for subscribing to the podcast via the media management application using the podcast information.

As a portable subscription file, one embodiment includes at least: an application identifier; and a network address for a podcast feed.

As a method for acquiring podcast information at a client application, the podcast information being acquired from a podcast hosting server via a network, one embodiment of the invention includes at least the acts of: accessing a podcast feed from the podcast hosting server via the network to acquire episode information for the podcast; determining one or more new episodes based on the acquired episode information; determining whether the podcast is still active at the client application; and receiving, at the client application, the one or more new episodes from the podcast hosting server over the network so long as it is determined that the podcast is still active at the client application.

As a computer readable medium including at least computer program code for acquiring digital multimedia asset information at a client application, the digital multimedia asset information being acquired from a digital multimedia asset hosting server via a network, one embodiment of the invention includes at least: computer program code for accessing a digital multimedia asset feed from the digital multimedia asset hosting server via the network to acquire episode information for the digital multimedia asset; computer program code for determining one or more new episodes based on the acquired episode information; computer program code for determining whether the client application or a user thereof has shown adequate interest in the digital multimedia asset; and computer program code for receiving, at the client application, the one or more new episodes from the digital multimedia asset hosting server over the network so long as it is determined that the client application or a user thereof has shown adequate interest in the digital multimedia asset.

As a podcast feed, one embodiment of the invention includes a plurality of segment elements, each of the segment elements including a segment link for a multimedia element and a time indication associated with the segment elements.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 8E is a screenshot of a podcast availability page according to one exemplary embodiment of the invention.

DESCRIPTION OF THE INVENTION

The invention pertains to improved podcasts and techniques that facilitate their use. The improved techniques can pertain to creating, publishing, hosting, accessing, subscribing, managing, transferring, and/or playing podcasts.

According to one aspect, a client application can subscribe to podcasts and then automatically monitor the podcasts for updates. When updates to the podcasts are available (e.g., new episodes), the updates can be downloaded to the client application. However, in the event that user interest in a podcast becomes inadequate, downloading of further updates can be restricted. According to another aspect, a podcast can be subscribed to through use of a portable subscription file. The portable subscription files are portable and transferable across networks, thereby providing a convenient way to facilitate subscription to podcasts. According to still another aspect, podcast feeds can be enhanced to include segment elements and other metadata. The segment links and time indications can be provided for each of the segments. A client application that presents a podcast to a user can provide an improved graphical user interface through use of the segment elements and other metadata.

Embodiments of the invention are discussed below with reference to FIGS. 1-14. However, those skilled in the art will readily appreciate that the detailed description given herein with respect to these figures is for explanatory purposes as the invention extends beyond these limited embodiments.

Figure 1:
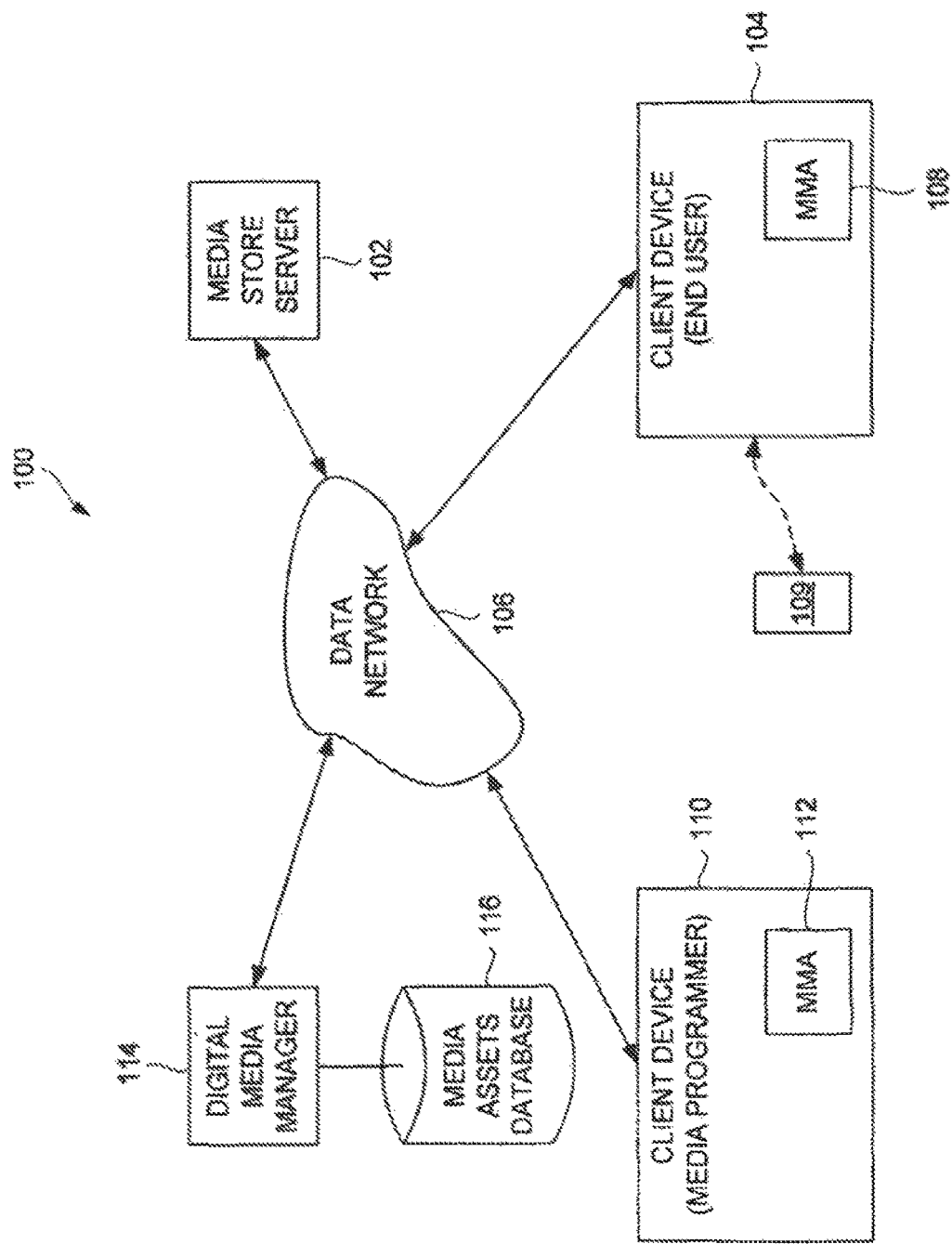
FIG. 1 is a block diagram of a media system according to one embodiment of the invention.

FIG. 1 is a block diagram of a media system 100 according to one embodiment of the invention. The media system 100 includes a media store server 102 that hosts an on-line media store. The media store server 102 can off-load commerce transactions and/or delivery of purchased digital media assets to other servers, if desired. As shown in FIG. 1, the media system 100 includes one or more client devices 104 for use by end users. The client devices 104 couple to a data network 106. Additionally, the media store server 102 also couples to the data network 106. In one implementation, the data network 106 can refer to one or more data networks, typically, high data-bandwidth networks, namely, wired networks, such as the Internet, Ethernet, gigabit Ethernet, and fiber optic, as well as wireless networks such as IEEE 802.11(a), (b) or (g) (WiFi), IEEE 802.16 (WiMax), and Ultra-Wide Band (UWB).

A computer program 108 (client or client application), typically a media management application (MMA) or other media player application, runs on the client device 104. One example of a media management application is the iTunes® application, produced by Apple Computer, Inc. of Cupertino, Calif. The client devices 104 are, in general, computing devices. As an example, the client devices 104 can be specific or general-purpose personal computers (or even portable media players). The client device 104 can couple to a portable media device 109 (portable media player). One example of a portable media player suitable for use with the invention is the iPod®, also produced by Apple Computer, Inc. The computer program 108 can be used by a consumer for a variety of purposes, including, but not limited to, browsing, searching, acquiring and/or purchasing media assets (including podcasts) from the on-line media store provided by the media store server 102, creating and sharing media asset groups (e.g., playlists), organizing media assets, presenting/playing media assets, transferring media assets between client devices 104, and synchronizing with portable media devices 109.

The media system 100 can also includes one or more client devices 110 for use by media programmers. The client devices 110 also run a computer program 112, typically a media management application (MMA) or other media player application. The computer program 112 can be the same as the computer program 108, though the computer program 112 might offer additional functionality for support of the media programmer. As an example, the media programmer that uses the computer program 112 might provide additional functionality for creating and publishing podcasts.

The media system 100 also includes a digital asset manager 114. The digital asset manager 114 is coupled to a media assets database 116. The media assets database 116 stores media asset information including metadata relating to digital media assets available for purchase at the on-line media store. The metadata can pertain to individual media assets (digital media assets) or media asset groups (digital media asset groups). Media assets can include, but are not limited to, music, video, text, and/or graphics files. One particular type of media asset or media asset group is a podcast, which often includes audio, graphics and text (but could also include video). In the case of music, a media asset group can be a playlist for the music. One specific example of a type of digital media asset group is referred to as an iMix™, which is a published playlist currently available for browsing and/or purchase on Apple Computer's iTunes® Music Store. Another specific example of a type of digital media asset group is referred to as an iEssential™, which is a published playlist created by a media programmer and currently available for browsing and/or purchase on Apple Computer's iTunes® Music Store. Still another specific example of a type of digital media asset group is referred to as a Celebrity Playlist, which is a published playlist created by a celebrity and which could be made available for browsing and/or purchase on Apple Computer's iTunes® Music Store.

The media store server 102 enables the user of a particular client device 104 to acquire media assets (e.g., podcasts). Subsequently, the client device 104 can download the media assets from the media store server 102, or some other server, via the data network 106. As will be understood by those familiar with data networks, other network configurations are possible. Furthermore, while the media store server 102 and the digital asset manager 114 are shown as individual and separate devices, it will be understood by those familiar with the art that other configurations are possible. As one example, each device can be implemented such that it is distributed over multiple server computers. As another example, these various servers and/or managers can be implemented by a single physical server computer.

Figure 2A:
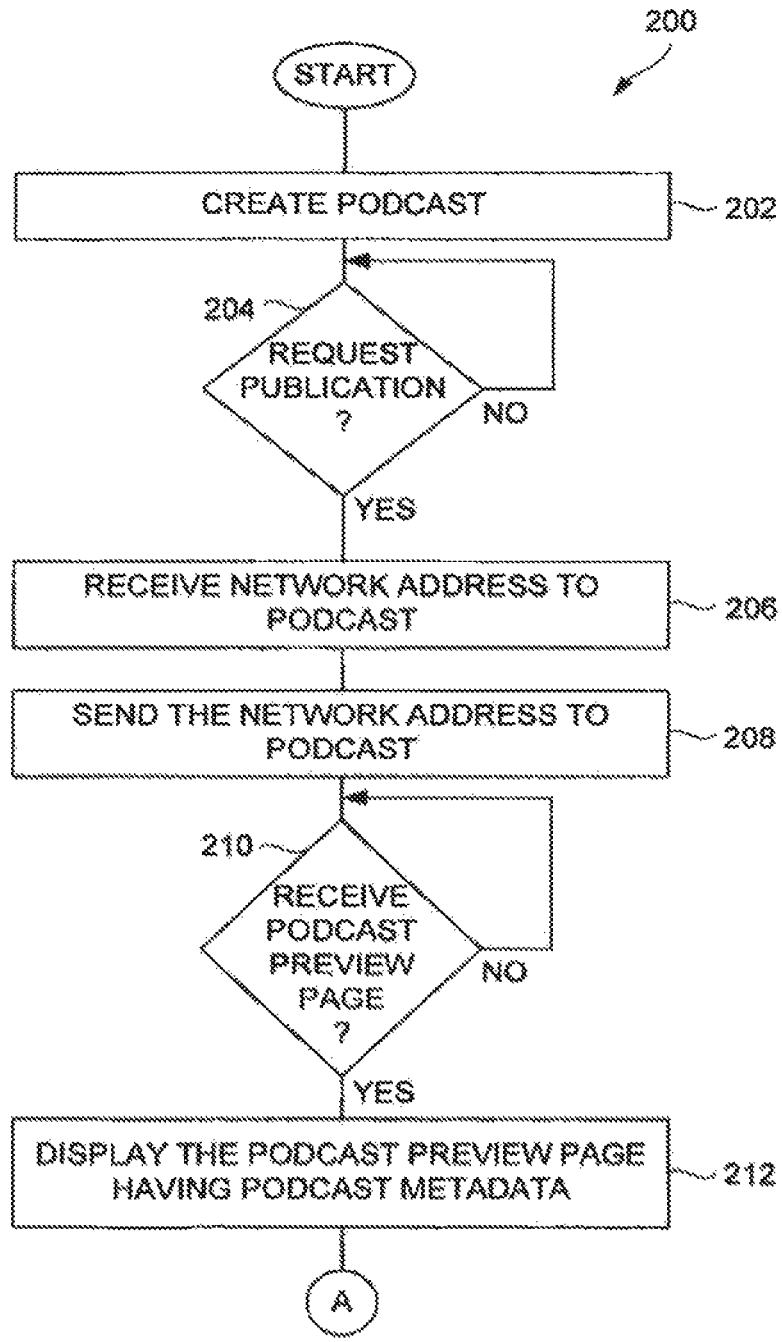
FIGS. 2A and 2B are flow diagrams of a podcast submission process according to one embodiment of the invention.
Figure 2B:
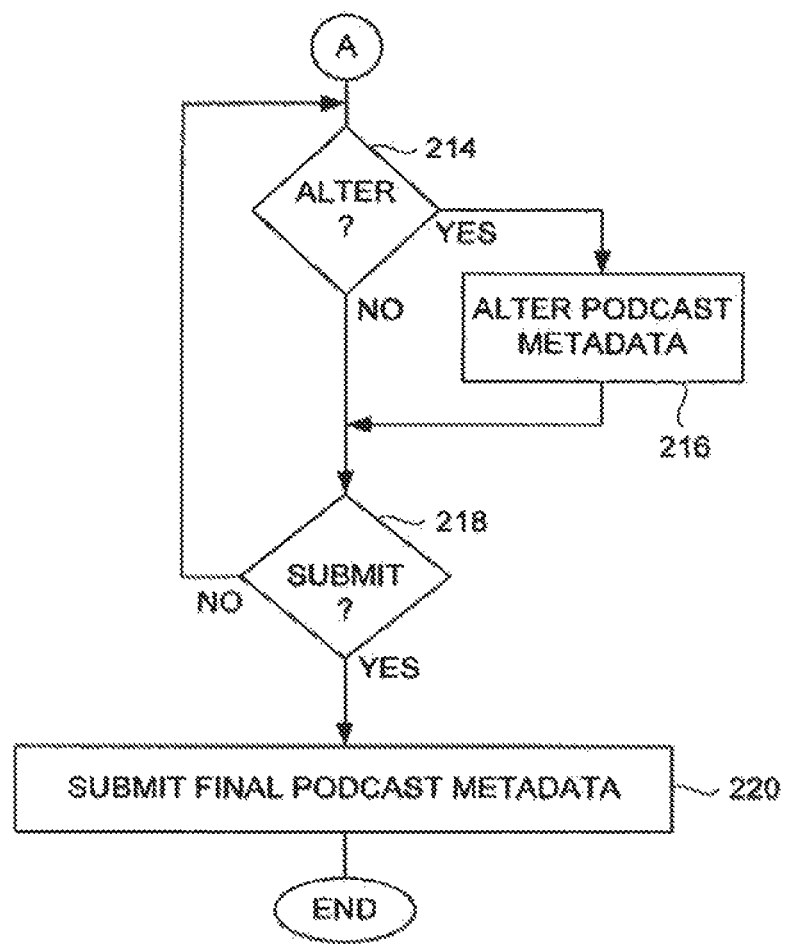

FIGS. 2A and 2B are flow diagrams of a podcast submission process 200 according to one embodiment of the invention. The podcast submission process 200 is, for example, performed by a client (e.g., application program). One example of a client is a media management application operating on a client device.

The podcast submission process 200 begins with a podcast being created 202. The podcast can be created during the podcast submission process 200 or can have been previously created. In one implementation, the podcast submission process 200 is performed by a single application, such as the media management application. In another implementation, the podcast creation can be done in one application and the podcast publication can be done in another application.

After the podcast has been created 202, a decision 204 determines whether publication has been requested. When the decision 204 determines that a publication request has not been made, the podcast submission process 200 awaits such a request. On the other hand, once the decision 204 determines that a publication request has been made, a network address (e.g., podcast feed URL) to the podcast is received 206. In one implementation, the user of the client would enter the appropriate network address into a text entry box of a graphical user interface being presented to the user by the client. The network address to the podcast is the sent 208 to a server. The server, for example, can be a media store or some other server. Thereafter, a decision 210 determines whether a podcast review page has been received. When the decision 210 determines that a podcast review page has not been received, the podcast submission process 200 awaits the receipt of the podcast review page. Alternatively, when the decision 210 determines that a podcast review page has been received, the podcast review page is displayed 212. Typically, the podcast review page includes at least basic podcast metadata pertaining to the podcast. Once the podcast review page is displayed 212, the basic podcast data can be changed (i.e., edited). In addition, the podcast review page can include one or more data entry fields that facilitate data entry pertaining to additional (or supplemental) podcast metadata that can be provided by the user.

Next, a decision 214 determines whether the user of the client desires to edit (change) the basic podcast metadata or provide additional podcast metadata with respect to the podcast preview page. When the decision 214 determines that the user does desire to edit the podcast metadata, the podcast metadata can be altered 216. As an example, the user can edit the basic podcast metadata or can enter additional podcast metadata using the data entry fields. One example additional metadata is to provide a category classification for the podcast. The additional podcast metadata can also be referred to as supplemental podcast metadata. Following the block 216, or directly following the decision 214 when altering is not been performed, a decision 218 determines whether the user has submitted the podcast metadata. Here, the submission of the podcast metadata indicates the user's acceptance of the podcast metadata, whether basic or additional podcast metadata, following any data alterations. Such podcast metadata being submitted can be referred to as final podcast metadata. Hence, when the decision 218 determines that the podcast metadata is to be submitted, the final podcast metadata is submitted 220. Typically, the final podcast metadata would be submitted 220 to a server, such as the media store server illustrated in FIG. 1.

An exemplary RSS feed for a podcast is provided immediately below. Note, as discussed in greater detail hereafter the RSS feed provides categories for the channel (i.e., show) as well as for each item (i.e., chapter). For each item, an audio file (e.g., MP3 or AAC format) is identified by a URL.

Exemplary RSS Feed

```
<?xml version="1.0" encoding="UTF-8"?>
<!-- must include xmlns:itunes tag -->
<rss xmlns:itunes="http://www.itunes.com/DTDs/Podcast-1.0.dtd" version="2.0">
    <channel>
        <title>All About Everything</title>
        <itunes:author>John Doe</itunes:author>
        <link>http://www.itunes.com/podcasts/everything/index.html</link>
        <description>All About Everything is a show about everything. Each week we dive
into every subject known to man and talk about everything as much as we
can.</description>
        <itunes:subtitle>All About Everything is a show about everything</itunes:subtitle>
        <itunes:summary>All About Everything is a show about everything. Each week we
dive into every subject known to man and talk about everything as much as we can.
Look for our Podcast in the iTunes Music Store</itunes:summary>
        <language>en-us</language>
        <copyright>Acme News Corp. 2005</copyright>
            <itunes:owner>
                <itunes:name>John Doe</itunes:name>
                <itunes:email>johndoe@mac.com</itunes:email>
            </itunes:owner>
            <image>
        <url>http://www.itunes.com/podcasts/everything/AllAboutEverything.jpg</url>
        <title>All About Everything</title>
        <link>http://www.-.com/podcasts/everything/index.html</link>
            </image>
            <!-- the max size for rss image is 144x400 -->
            <!-- iTunes allows images larger than that -->
            <itunes:link rel="image" type="video/jpeg"
href="http://www.itunes.com/podcasts/everything/AllAboutEverything.jpg">All About
Everything</itunes:link>
        <category>Technology</category>
            <!-- categories can be nested for category/subcategory -->
            <!-- there can be multiple itunes categories. the first set is the primary category/
subcategory -->
            <itunes:category text="Technology">
                <itunes:category text="Gadgets"/>
            </itunes:category>
            <itunes:category text="Politics" />
            <itunes:category text="Technology">
                <itunes:category text="News"/>
            </itunes:category>
    <item>
        <title>Shake Shake Shake Your Spices</title>
            <itunes:author>John Doe</itunes:author>
            <description>This week we talk about salt and pepper shakers, comparing and contrasting pour
rates, construction materials, and overall aesthetics.</description>
            <itunes:subtitle>A short primer on table spices</itunes:subtitle>
            <itunes:summary>This week we talk about salt and pepper shakers, comparing and
contrasting pour rates, construction materials, and overall aesthetics. Come and join the
party!</itunes:summary>
            <enclosure
url="http://www.itunes.com/podcasts/everything/AllAboutEverythingEpisode3.mp3"
length="8727310" type="x-audio/mp3" />
<guid>http://www.itunes.com/podcasts/everything/AllAboutEverythingEpisode3.mp3<
/guid>
            <pubDate>Wed, 15 Jun 2005 11:39:59 GMT</pubDate>
            <category>Technology</category>
            <itunes:category text="Technology">
                <itunes:category text="Gadgets"/>
            </itunes:category>
```

```
            <itunes:explicit>no</itunes:explicit>
            <itunes:duration>7:04</itunes:duration>
            <itunes:keywords>salt pepper shaker exciting</itunes:keywords>
    </item>
    <item>
        <title>Socket Wrench Shootout</title>
            <itunes:author>Jane Doe</itunes:author>
        <description>This week we talk about metric vs. old english socket wrenches. Which
one is better? Do you really need both?</description>
        <itunes:subtitle>Comparing socket wrenches is fun!</itunes:subtitle>
        <itunes:summary>This week we talk about metric vs. old english socket wrenches.
Which one is better? Do you really need both? Get all of your answers
here.</itunes:summary>
        <enclosure
url="http://www.itunes.com/podcasts/everything/AllAboutEverythingEpisode2.mp3"
length="5650889" type="x-audio/mp3" />
<guid>http://www.itunes.com/podcasts/everything/AllAboutEverythingEpisode2.mp3<
/guid>
        <pubDate>Wed, 8 Jun 2005 11:20:59 GMT</pubDate>
        <category>Politics</category>
        <itunes:category text="Technology">
          <itunes:category text="Gadgets"/>
        </itunes:category>
                        <itunes:explicit>no</itunes:explicit>
                        <itunes:duration>4:34</itunes:duration>
                        <itunes:keywords>metric socket wrenches
tool</itunes:keywords>
                </item>
                <item>
                    <title>Red, Whine, and Blue</title>
                    <itunes:author>Various</itunes:author>
                        <description>This week we talk about surviving in a Red state if
you're a Blue person. Or vice versa.</description>
                        <itunes:subtitle>Red + Blue != Purple</itunes:subtitle>
                        <itunes:summary>This week we talk about surviving in a Red
state if you're a Blue person. Or vice versa. Or moving to Canada.</itunes:summary>
                        <enclosure
url="http://www.itunes.com/podcasts/everything/AllAboutEverythingEpisode1.mp3"
length="4989537" type="x-audio/mp3" />
<guid>http://www.itunes.com/podcasts/everything/AllAboutEverythingEpisode1.mp3</
guid>
                        <pubDate>Wed, 1 Jun 2005 10:21:04 GMT</pubDate>
                        <category>Politics</category>
                        <itunes:category text="Technology">
                            <itunes:category text="Gadgets"/>
                        </itunes:category>
                        <itunes:explicit>no</itunes:explicit>
                        <itunes:duration>3:59</itunes:duration>
                        <itunes:keywords>politics red blue state</itunes:keywords>
                </item>
        </channel>
</rss>
```

Since shows and episodes can be associated with categories, improved user interfaces can be provided such that podcasts can be sorted, searched or browsed based on category.

Figure 3A:
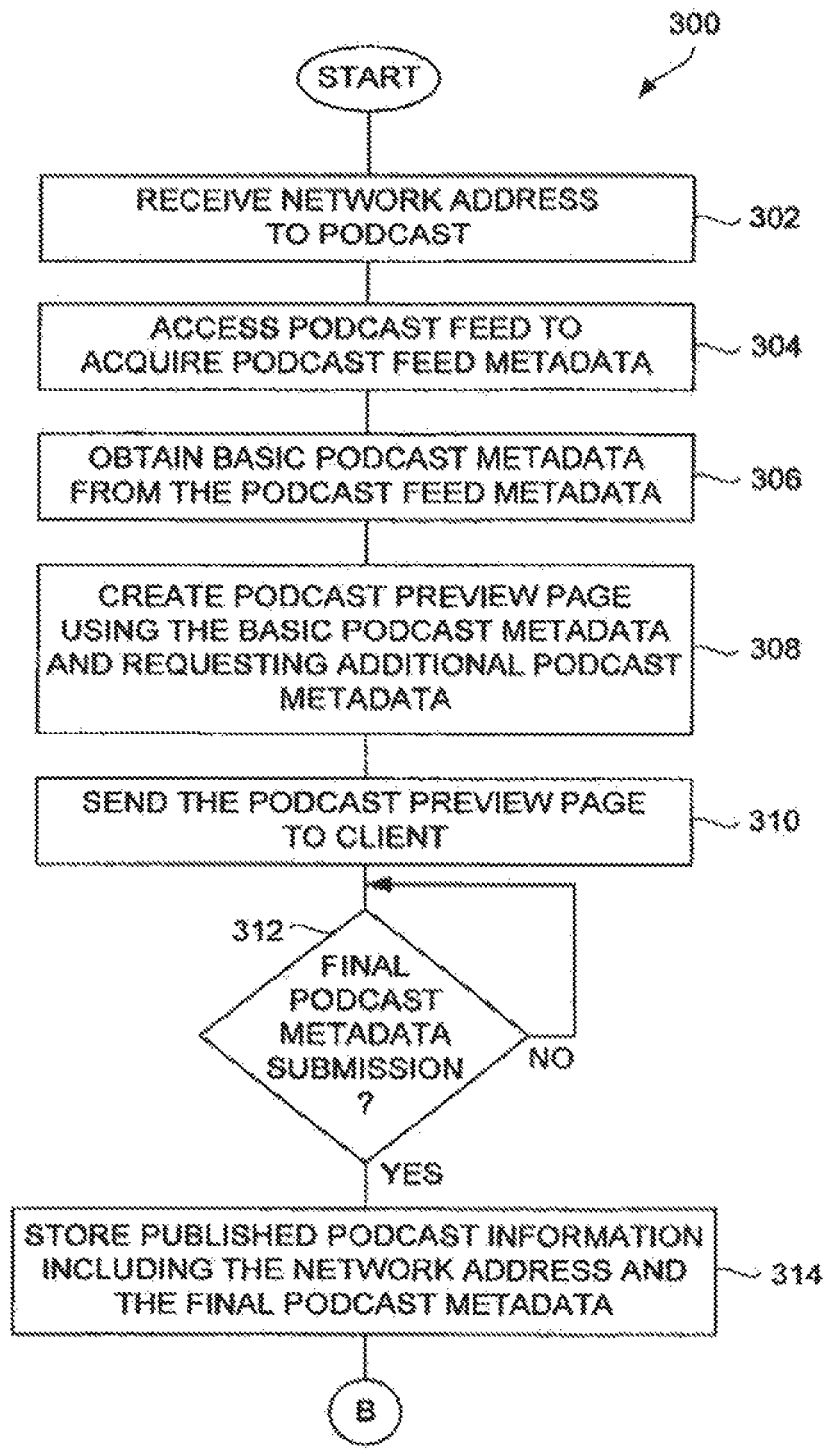
FIGS. 3A and 3B are flow diagrams of a podcast publication process according to one embodiment of the invention.
Figure 3B:
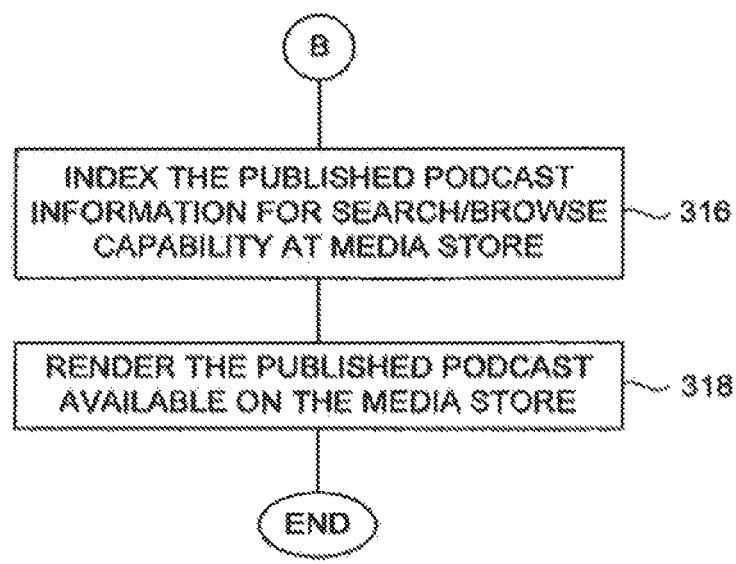

FIGS. 3A and 3B are flow diagrams of a podcast publication process 300 according to one embodiment of the invention. The podcast publication process 300 is performed by a server and represents counterpart processing to that of the podcast submission process 200 illustrated in FIGS. 2A and 2B.

The podcast publication process 300 initially receives 302 a network address to a particular podcast that is to be published. For example, the network address can be provided by a user of the client and then sent to the server (e.g., blocks 206 and 208 of FIG. 2A).

After the network address to the particular podcast has been received 302, the server accesses 304 a podcast feed (e.g., RSS feed) to acquire podcast feed metadata. In other words, using the network address, the server connects to the podcast feed for the particular podcast to acquire podcast feed metadata. Then, basic podcast metadata is obtained 306 from the podcast feed metadata. The obtaining of the basic podcast metadata can involve parsing of the podcast feed metadata according to one implementation. Typically, the podcast feed metadata would include tags or other markers (e.g., XML elements) to distinguish different fields of metadata being provided within the podcast feed metadata.

Next, a podcast review page is created 308. In one implementation, the podcast review page includes the basic podcast metadata and requests additional podcast metadata. The podcast review page is then sent 310 to the client.

A decision 312 then determines whether a final podcast metadata submission has been received. When the decision 312 determines that the final podcast metadata submission has not been received, the podcast publication process 300 awaits such a submission. On the other hand, once the decision 312 determines that the final podcast metadata has been submitted, published podcast information is stored 314 at the server. The published podcast information includes at least the network address and the final podcast metadata which are both associated with the particular podcast. At this point, the particular podcast has been published to the server.

In addition, the published podcast information can be indexed 316 so as to facilitate search and/or browse capabilities at the server, such as the media store server 102 of FIG. 1. Finally, the published podcast is rendered 318 available on the server (e.g., media store). Following the operation 318, the podcast publication process 300 is complete and ends.

In another embodiment, a podcast publication process, such as the podcast publication process 300, can be modified to include an authentication process. The authentication process can be utilized to authenticate the person who is attempting to publish a podcast. The authentication can performed in a variety of different ways. In one implementation, the authentication can authenticate the person attempting to publish as being known to the server (e.g., account holder). In another implementation, the authentication can authenticate the person with reference to the podcast host, creator, etc.

Browsing or searching of media items available on a server (e.g., media store) can be performed much like searching for other types of media assets. For additional details on searching or browsing for media assets see U.S. Pat. No. 8,161,411, issued Apr. 17, 2012, and entitled "GRAPHICAL USER INTERFACE FOR BROWSING, SEARCHING AND PRESENTING MEDIA ITEMS" which is incorporated herein by reference. However, as to browsing, to facilitate efficient browsing of podcasts, a graphical user interface having a hierarchy of lists can be displayed for a user. In one implementation, a first list of selectable items will be it list of genres. The user will select the genre denoted "Podcasts". Once the selection is made a second list of selectable items will be displayed. The selectable items in the second list are denoted "Categories". The categories are different categories that podcasts can be assigned to. Then, in response to is category selection, a third list of selectable items will be displayed. The selectable items in the third list are denoted "Subcategories" and represent available subcategories of the selected category, to the extent utilized. After the various selections have been made those podcasts that match the selected category and selected subcategory (if used) are displayed in a media asset listing area.

An application program window can be displayed by the client. The application program window can include a first sub-window and a second sub-window. The first sub-window includes a first region, a second region and a third region. The first region can display a list of available genre (genre list). After a user has selected one of the items within the genre list being displayed in the first region (namely, the podcast item), the second region can be populated with a list of podcast categories that are associated with the selected genre from the genre list. The list of podcast categories is provided by the remote server to the application program that presents the application program window. After the user has selected one of the available categories of the second region, the third region can be populated with a list of subcategories that are associated with the selected category. The subcategories within the third region, if any, are those pertaining to the selected category. When the list of subcategories has a plurality of items, the user would select one of the items. Once the user has selected one if the subcategories (or categories if no subcategories), the second sub-window can be populated with a list of available podcasts that are associated with the category and subcategory (if any). The list of available podcasts can display descriptive information for each of the podcasts. For example, the list of available podcasts can be presented in a row and column (e.g., table) format with each row pertaining to a different podcast, and with the columns pertaining to podcast name, artist, description and price. Further, within the price column, each of the rows can include a "Subscribe" button that allows for ease of subscripting the particular podcast by the user.

Figure 4:
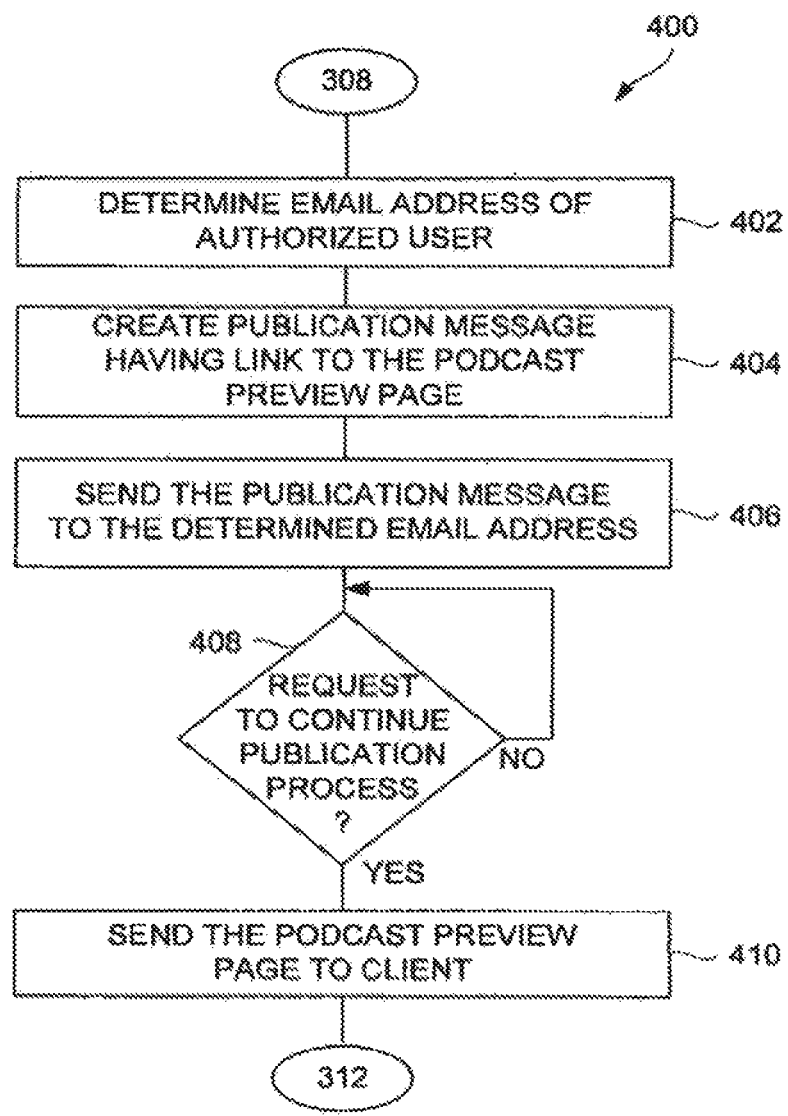
FIG. 4 is a flow diagram of an authentication process according to one embodiment of the invention.

FIG. 4 is a flow diagram of authentication process 400 according to one embodiment of the invention. The authentication process 400 can, for example, be utilized in place of the block 310 illustrated in FIG. 3A. The authentication process 400 initially determines 402 an e-mail address for an authorized user (e.g., authorized publisher). The authorized user, in one embodiment, pertains to an account holder on the server or client. In another embodiment, the authorized user can be obtained from the RSS feed (i.e., podcast data) associated with the podcast to be published. In either case, an e-mail address associated with an authorized user is determined 402. After the e-mail address has been determined 402, a publication message is created 404 having a link to the podcast preview page. As an example, the publication message can explain to the recipient that they are presumably in the process of publishing one of their podcasts and to select the enclosed link to continue the publishing process. In the event the publication of the podcast is not to be authorized, recipient can cancel the publication process.

Thereafter, a decision 408 determines whether a request to continue the publication process has been received from the authorized user. When the decision 408 determines that a request to continue the publication process has not been received, the authentication process 400 awaits such a request. In one implementation, the request is a request to access a podcast preview page. The request can be made by the user by either selecting the link in the publication message or copying the link into a data entry area provided at the client. When the decision 408 determines that a request to continue the publication process has been received, the podcast review page is sent 410 to the client. Thereafter, the processing proceeds to operation 312 and subsequent operations of the podcast publication process 300 as previously discussed.

Figure 5A:
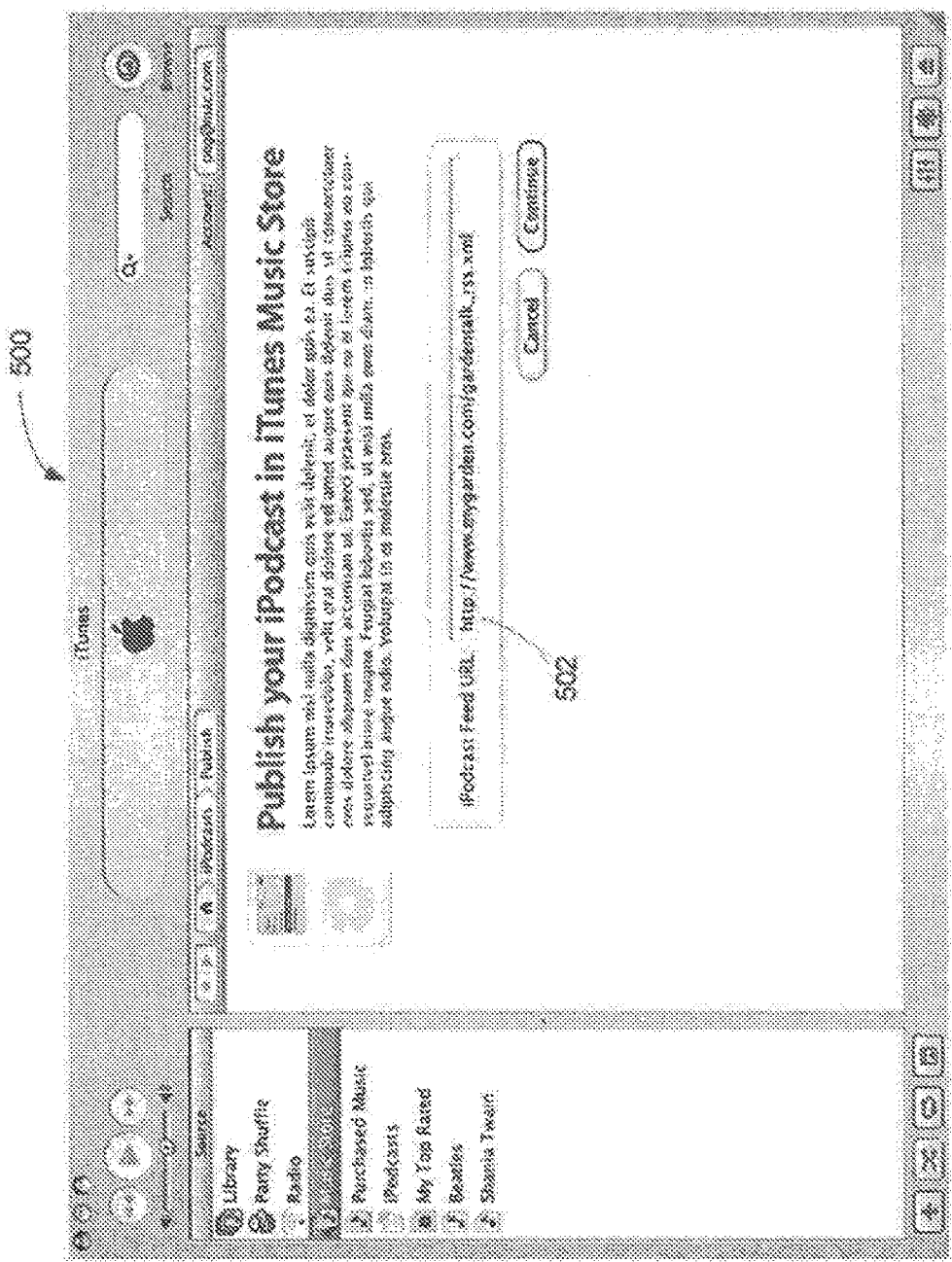
FIG. 5A is a screenshot of a network address submission page according to one exemplary embodiment.

FIG. 5A is a screenshot of a network address submission page 500 according to one exemplary embodiment. The network address submission page 500 enables a user to enter a network address, namely a feed URL, to an existing podcast that is to be published on a media store, which in this example is the iTunes® Music Store. The feed URL is entered into a textbox 502. In this example, the feed URL entered is: "http://www.mygarden.com/garden-talk_rss.xml".

Figure 5B:
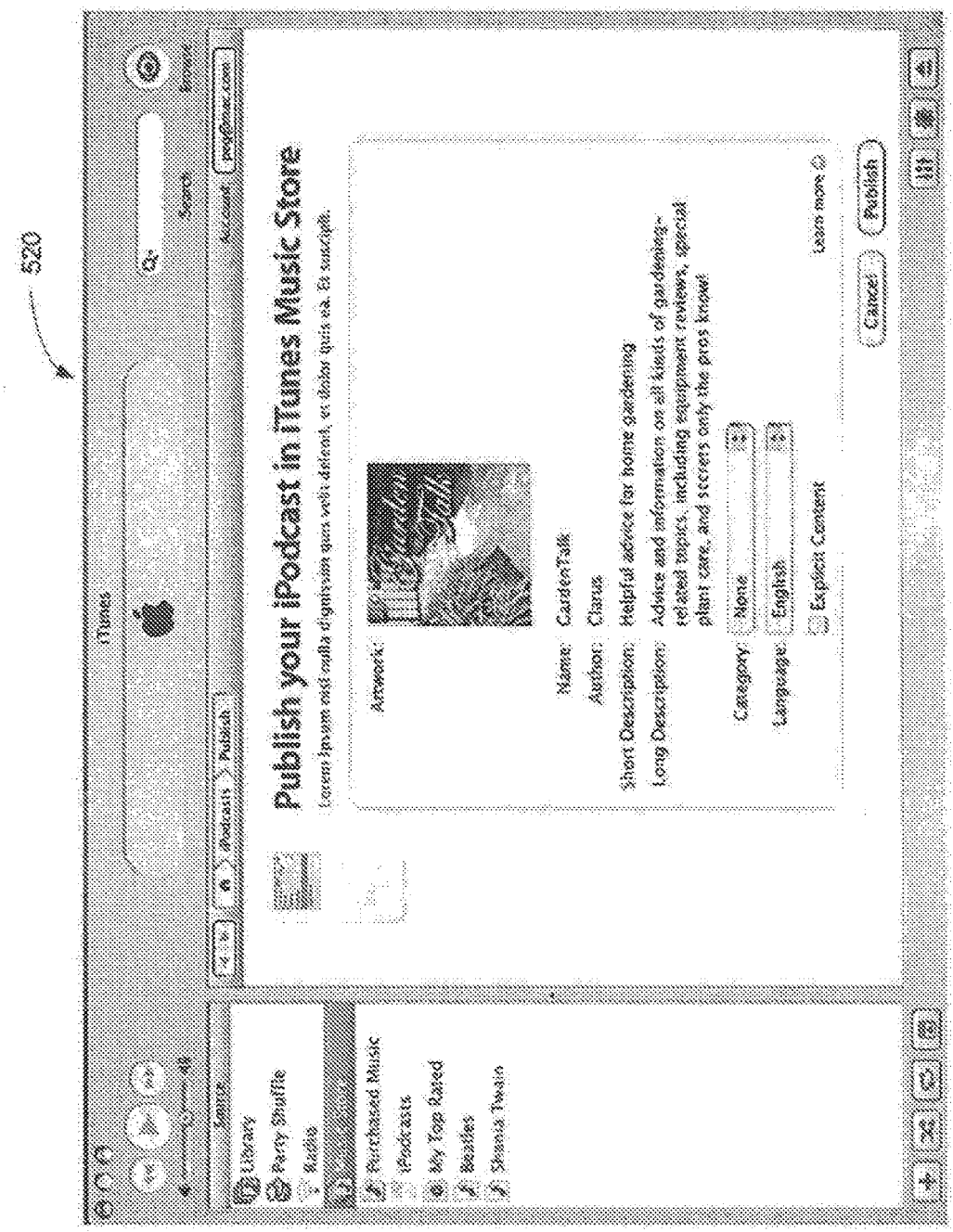
FIG. 5B is a screenshot of a podcast preview page according to one exemplary embodiment.

FIG. 5B is a screenshot of a podcast preview page 520 according to one exemplary embodiment. In this example, the title of the podcast being previewed is "Garden Talk". The podcast preview page 520 informs the user of how the podcast will be presented at the media store. Here, the podcast metadata being previewed includes: artwork, name, author, short description, long description, category and language. In this example, much of the podcast metadata being previewed can be acquired from the podcast feed itself. However, other metadata, such as category and language, that are not acquired from the podcast feed can be selected or otherwise entered by the user. Regardless, the user can be permitted to edit the podcast metadata being previewed. Additionally, a selection can be made to enable the user (publisher) to indicate whether the podcast contains explicit content. Once the user is prepared to accept the podcast metadata being previewed, the user selects the "Publish" button.

Once a podcast has been published, the podcast can become available on a media store (on-line media store). The media store can host or not host the podcast. If the media store stores all or most of the podcast content, then the podcast can be considered hosted by the media store. On the other hand, if the media store only maintains metadata for the podcast, then the media store does not host the podcast. When the media server does not host the podcast, a third-party server can host the podcast and the media store accesses the podcast feed as appropriate to acquire an data it needs. A client would access the podcast feed from the hosting server to acquire podcast data it desires to store locally. Hence, in one case the media store holds the content of the podcast, and in another the media store does not hold the content of the podcast.

The media store can be configured so that podcasts can be searched or browsed on the media store. The search or browsed functions can operate similar to searching for albums on an on-line music store. However, in the case of podcasts, the search or browse operations are with respect to podcasts that have been published to the media store. Typically, with music, browsing is achieved by a hierarchy of levels including artist, album and song. The corollary in the case of podcasts is a hierarchy of levels including podcast (or podcast category), show and episodes.

A media store can also organize podcasts into different categories to facilitate their discovery by users interacting with the media store. Examples of categories include: Arts & Entertainment, Biography and Memoir, Business, Classics, Comedy, Drama & Poetry, Fiction, History, Kids & Young Adults, Languages, Mystery, and News.

Still further, certain podcasts that have been published to the media store can be emphasized on a particular page of the media store. For example, certain podcasts can be emphasized over other using various criteria, such as randomly chosen, ratings, most active download, sponsorship, or the like. Similarly, "new shows" or "just added" shows that have been recently made available on the media store can be emphasized. FIG. 8B discussed below provides an example of a web page provided by a media store wherein certain podcasts are emphasized.

Figure 6:
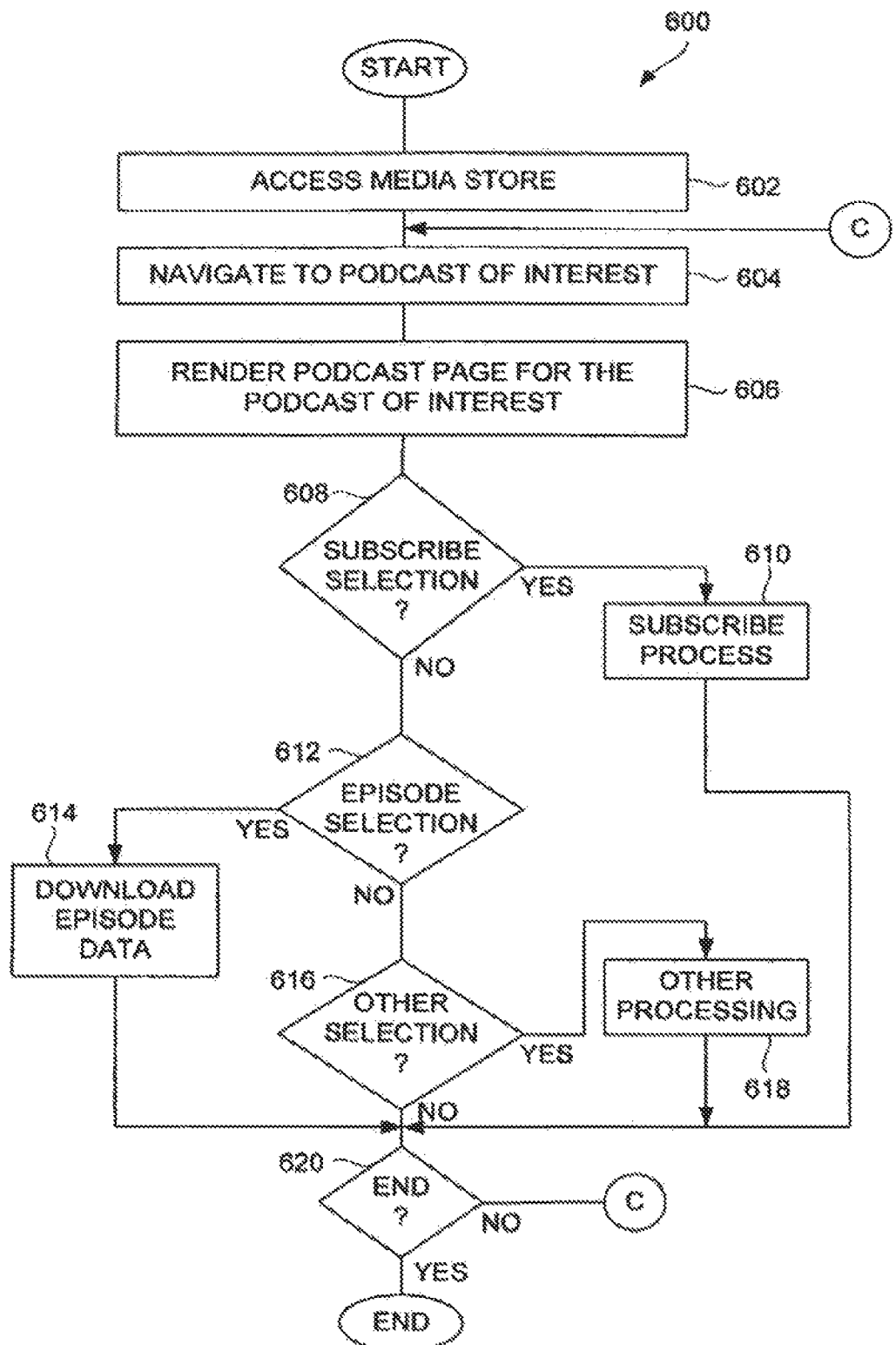
FIG. 6 is a flow diagram of a media store podcast interaction process according to one embodiment of the invention.

FIG. 6 is a flow diagram of a media store podcast interaction process 600 according to one embodiment of the invention. The media stow podcast interaction process 600 initially accesses 602 the media store. Then, at the media store, a user can navigate 604 to a podcast of interest. The navigation can take various different forms. One example of navigation is a search process. Another example of navigation is a browse process. Still another example of navigation is a manual next entry of a network address (e.g., RSS feed URL). Regardless of how the navigation occurs, once the podcast of interest is identified, a podcast page for the podcast of interest is rendered 606. The podcast page can be rendered 606 on a display (display screen) associated with a client device, such as the client device 104 illustrated in FIG. 1. A podcast page can include information (e.g., metadata) pertaining to the podcast, including a description of the podcast, artwork and episodes information. The podcast page cam also facilitate subscribing to the podcast or getting particular episodes. Still further, the podcast page could permit user ratings. The podcast page might also provide a link to facilitate a user reporting some sort of concern.

After the podcast page is rendered 606, a user of the client device (client) can interact with the podcast page to make any of a number of different selections. These selections can initiate operations at the client device. Two particular operations associated with podcasts are (1) subscribing to a podcast, and (2) downloading particular episodes of a podcast.

A decision 608 determines whether a subscribe selection has been made. When the decision 608 determines that a subscribe selection has been made, a subscribe process 610 is performed. A subscribe process 610 operates to subscribe the client device or client) with a host device for the podcast of interest. Alternatively, when the decision 608 determines that a subscribe selection has not been made, a decision 612 determines whether an episodes selection has been made. When the decision 612 determines that an episode selection has been made, episode data pertaining to the episode selection is downloaded 614. Here, the episode data would be downloaded 614 to the client device. In one implementation, the episode data includes at least an audio file and database content. The database content may be part of the audio file or a separate file or otherwise provided. On the other hand, when the decision 612 determines that an episodes selection has not been made, then a decision 616 determines whether another selection has been made. When the decision 616 determines that another selection has been made, other processing 616 can be performed. Following the blocks 610, 614 and 618, as well as following the decision 616 when there are no other selections, a decision 620 determines whether the media store podcast interaction process 600 should end. When the decision 620 determines that the media store podcast interaction process 600 should not end, the processing returns to repeat the block 604 and subsequent blocks. Alternatively, when the decision 620 determines that the media store podcast interaction process 600 should end, then the media store podcast interaction process 600 is complete and ends.

Figure 7:
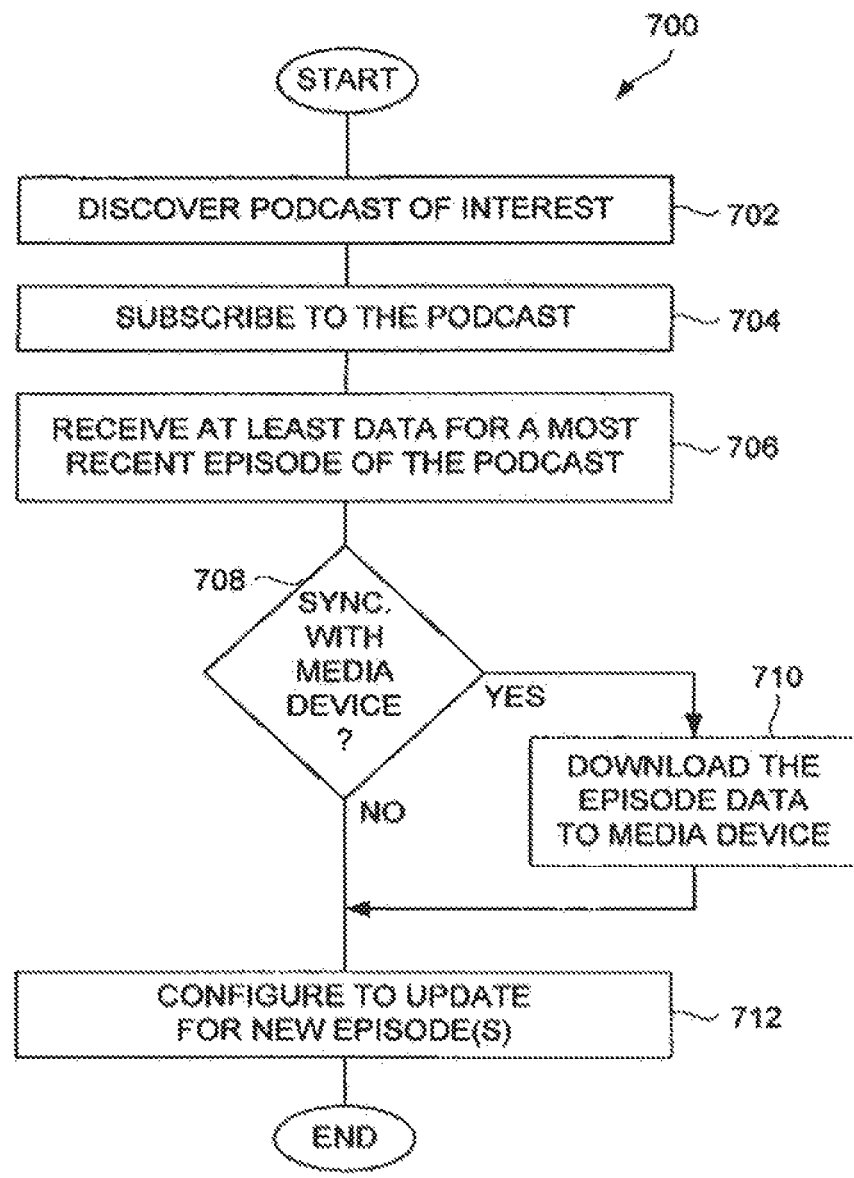
FIG. 7 is a flow diagram of an integrated podcast acquisition process according to one embodiment of the invention.

FIG. 7 is a flow diagram of an integrated podcast acquisition process 700 according to one embodiment of the invention. The integrated podcast acquisition process 700 is performed by a client device, such as the client device 104 illustrated in FIG. 1. More specifically, the integrated podcast acquisition process 700 is performed by a media management application, such as the media management application 108 operating on the client device 104 illustrated in FIG. 1. More generally, the media management application can be referred to as a client or client application.

The integrated podcast acquisition process 700 initially discovers 702 a podcast of interest. The podcast of interest can be discovered 702 through interaction with respect to a media store, such as discussed above with respect to FIG. 6. After the podcast of interest has been discovered 702, a user or client can subscribe 704 to the podcast. Once subscribed 704 to the podcast, the client can receive 705 at least data for a most recent episode of the podcast. Although the client could receive data for other episodes, given the large number of episodes that can be present, it may be more efficient and prudent to only initially receive the most recent episode. As discussed below, the user or client will be able to request to receive other prior episodes if so desired.

Next, a decision 708 determines whether synchronization should be performed between the client and a media device. The media device has typically previously been associated with the client. When the decision 708 determines that synchronization with the media device should be performed, the episode data (for the most recent episode can be downloaded 710 to the media device. In one embodiment, the data received includes an audio file (e.g., MP3 file or MPEG4 file or AAC file) as well as metadata pertaining thereto. At the client or client device, in one embodiment, the audio file can be stored in a file system and the metadata can be stored in a database. Following the block 710, or following the decision 708 when synchronization with the media device is not being performed, the client can be configured 712 to update for new episodes. Here, the configuration for updating can be set-up for an individual podcast or for groups of podcasts, or for all podcasts. As an example, one configuration parameter is how often to check for updates to the podcasts. Following the block 712, the integrated podcast acquisition process 700 is complete and ends.

Interestingly, in one embodiment, a single client application (e.g., media management application) operating on a client device can carry out the operations in FIG. 7. More particularly, the client application can discover a podcast, subscribe to a podcast, receive podcast data (including metadata and content), manage podcasts, and transfer podcast data to (or remove from) a media device (e.g., a portable media device, such as a media player). Still further, in another embodiment, the client application can also include a podcast creation or authoring capabilities. This high degree of integration enables improved operation as well as greater ease of use and greater user satisfaction.

Figure 8A:
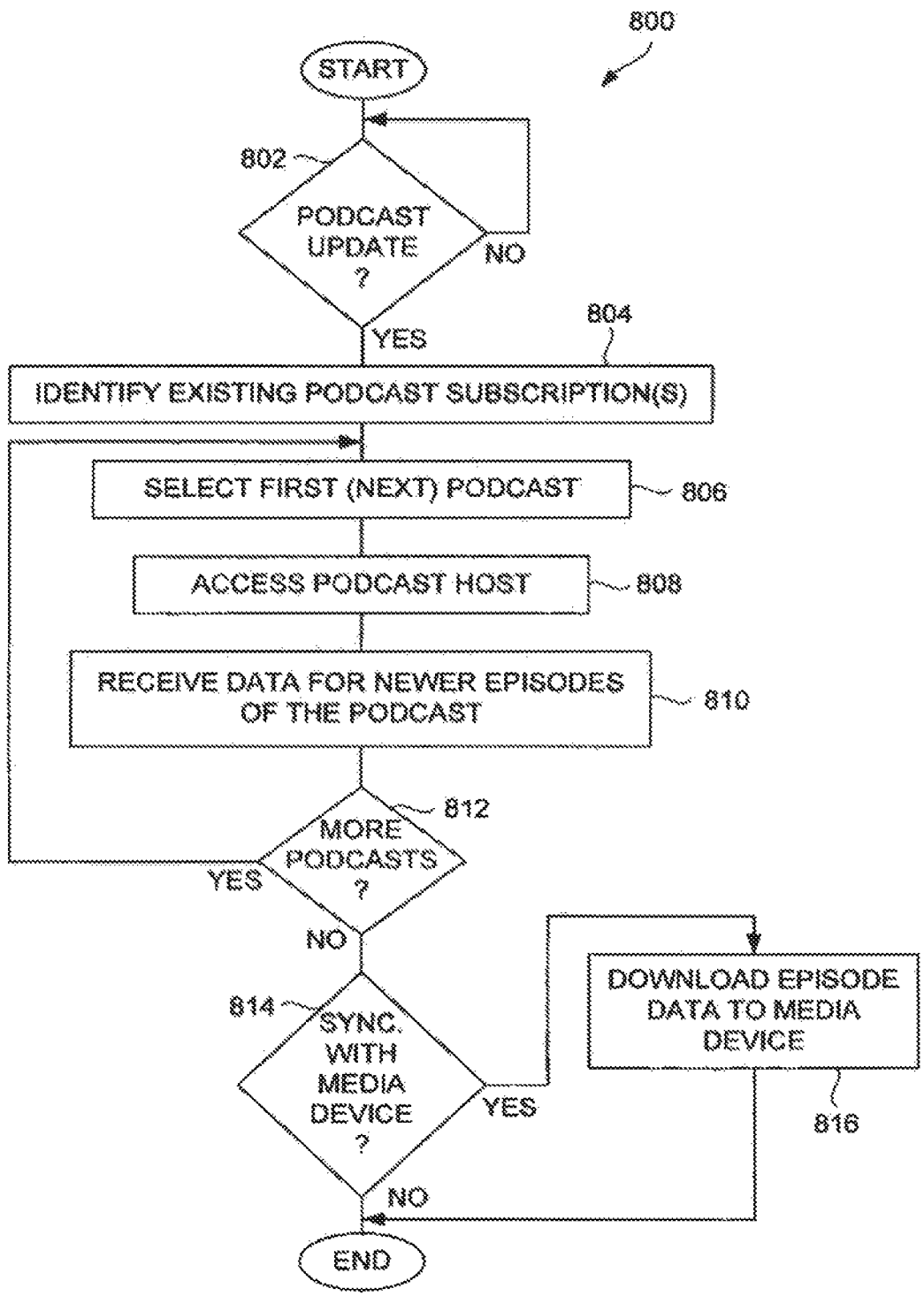
FIG. 8A is a flow diagram a podcast update process according to one embodiment of the invention.
Figure 8B:
FIG. 8B is a screenshot of a podcast base page according to one exemplary embodiment of the invention.

FIG. 8A is a flow diagram a podcast update process 800 according to one embodiment of the invention. The podcast update process 800 generally determines when and how any podcast is updated at a client so as to obtain any new episodes associated with the podcast.

The podcast update process 800 begins with a decision 802 that determines whether a podcast update is to be performed. The podcast update can, for example, be determined based on the configuration 712 for update provided in FIG. 7. When the decision 802 determines that a podcast update has not been performed, the podcast update process 800 is deferred. Once the decision 802 determines that a podcast update is to be performed, existing podcast subscriptions are identified 804. Here, it is assumed that the podcast update process 800 is commonly performed for a group or all of the podcasts residing on the client. Once the existing podcast subscriptions have been identified 804, a first podcast is selected 806. The podcast host for the selected podcast is accessed 808. The podcast host is typically a third-party server that provides the RSS podcast feed. However, the podcast host can also be the media store, if the media store is hosting the podcast.

Next, data for any newer episodes of the podcast are received 810. The data for the newer episodes of the podcast can be received from the podcast host. For example, though examination of the RSS podcast feed, any newer existing episodes can be identified and then downloaded. The client can maintain data indicating which episodes is already has received.

Thereafter, a decision 812 determines whether there are more podcasts (i.e., identified podcasts) to be updated. When the decision 812 determines that them are more podcasts to be updated, the podcast update process 800 returns to repeat the block 806 and subsequent blocks. When the decision 812 determines that there are no more podcast to the updated, a decision 814 determines whether synchronization with a media device should be performed. When the decision 814 determines that synchronization with a media device should be performed, episode data (new episode data) can be downloaded 816 to the media device. Following the block 816, or following the decision 814 when synchronization is not being performed, the podcast update process 800 ends.

Figure 8C:
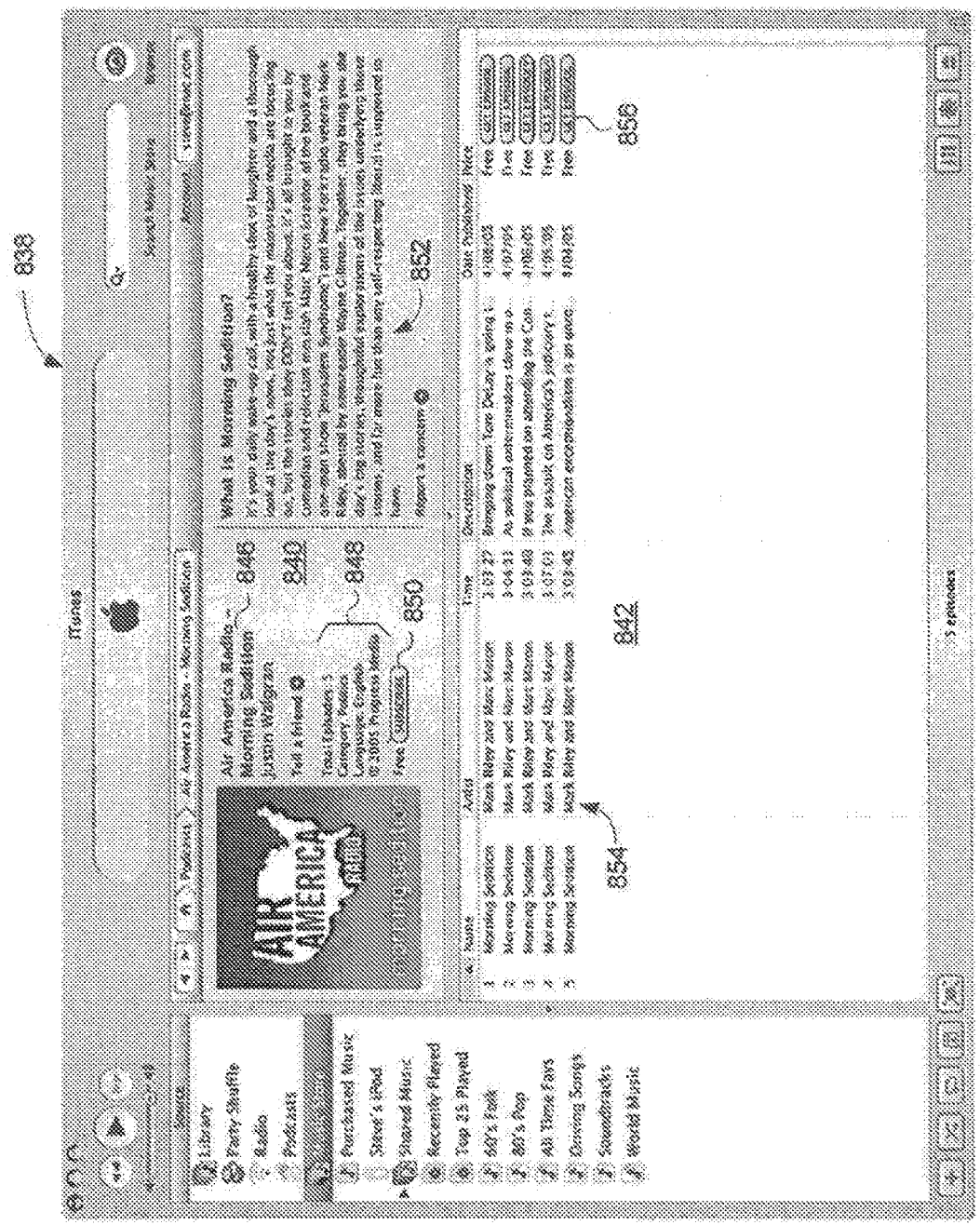
FIG. 8C is a screenshot of a podcast page according to one exemplary embodiment of the invention.
Figure 8D:
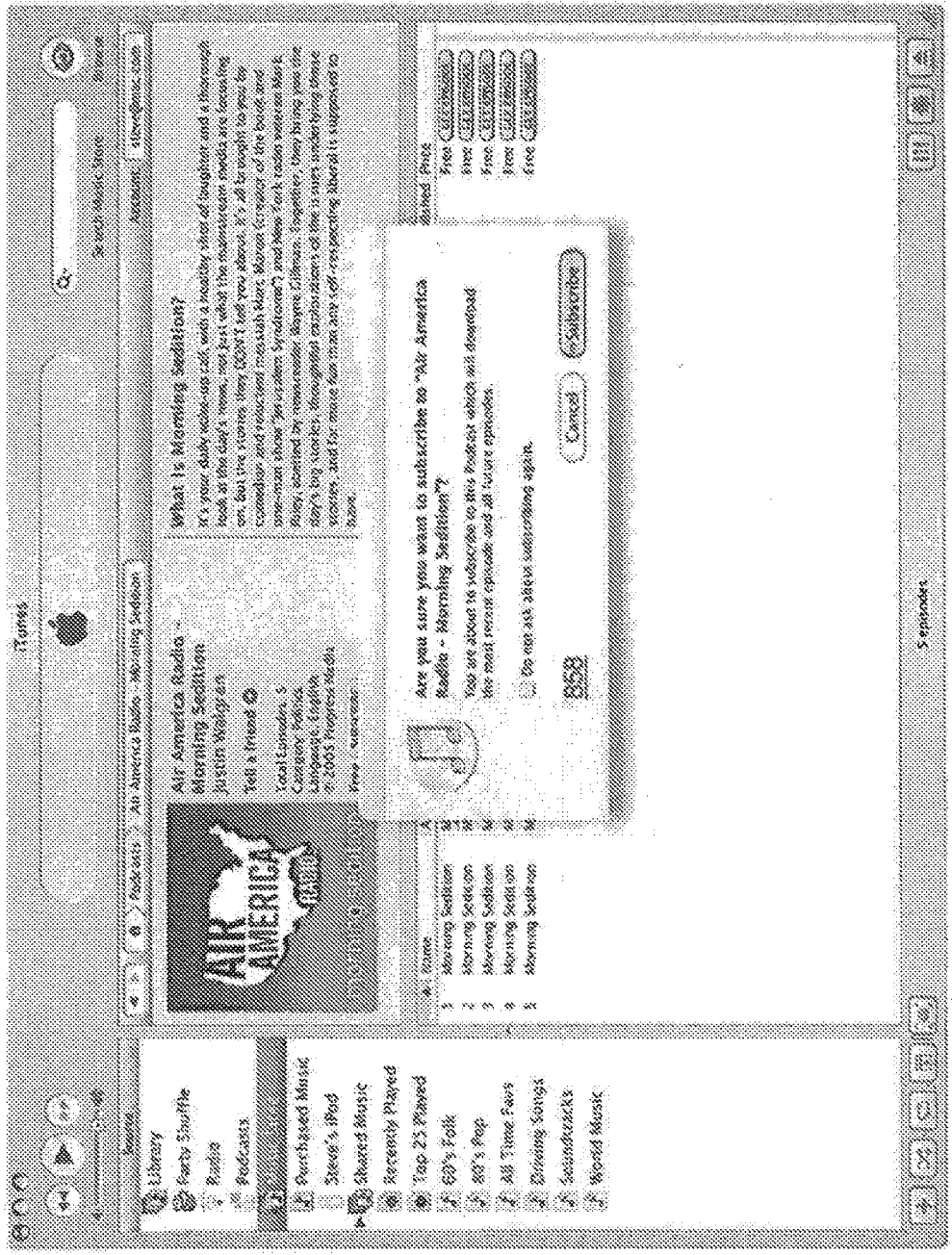
FIG. 8D is a screenshot of the podcast page having a subscribe confirmation dialog according to one exemplary embodiment of the invention.

FIGS. 8B, 8C and 8D are screenshots associated with presentation of podcasts on an media store. In this example, the media store is the iTunes® Music Store, which also provides capabilities to browse and search for podcasts.

FIG. 8B is a screenshot of a podcast base page 820 according to one exemplary embodiment of the invention. A source indicator 822 indicates that the podcast base page 820 is provided by the on-line media store. A selector 824 also indicates that "podcasts" is the type of media being presented. An emphasis area 826 contains artwork associated with three different podcasts by emphasized. The podcast base page 820 also includes a daily top download area 828 that identifies those top download podcasts for the day. The podcast base page 820 also includes some grouping of podcasts, such groupings as New Shows 830, Just Added 832, and featured podcasts 836. These groupings can be displayed with a scroll window that can transition (e.g., horizontally) in accordance with a transition effect. The podcast base page 820 further includes another emphasis area 834.

Once a particular podcast is selected, a podcast page is presented. FIG. 8C is a screenshot of a podcast page 838 according to one exemplary embodiment of the invention. The podcast page 838 includes a metadata region 840 and an episode listing area 842. The metadata region 840 includes podcast artwork 844, podcast title 846, and other metadata information 848 (e.g., total episodes, category, language, and copyright information. A "Subscribe" button 850 is also displayed. In addition, the metadata region 840 also includes as description 852 for the podcast. The episode listing area 842 contains a list 854 of episodes of the podcast that are available. Each of the episodes in the list 854 includes a "Get Episode" button 856 to obtain the corresponding episode. By selecting the "Subscribe" button 850, the user can cause the media management application to subscribe to the podcast. In this example, there is no cost to subscribe to the podcast. However, in other embodiments, there can be a charge imposed to subscribe to a podcast. By selecting the "Get Episode" button 856, the use can cause the media management application to obtain the particular episode.

FIG. 8D is a screenshot of the podcast page 838 having a subscribe confirmation dialog 858 that permits the user to confirm that they want to subscribe to the podcast.

Figure 8E:
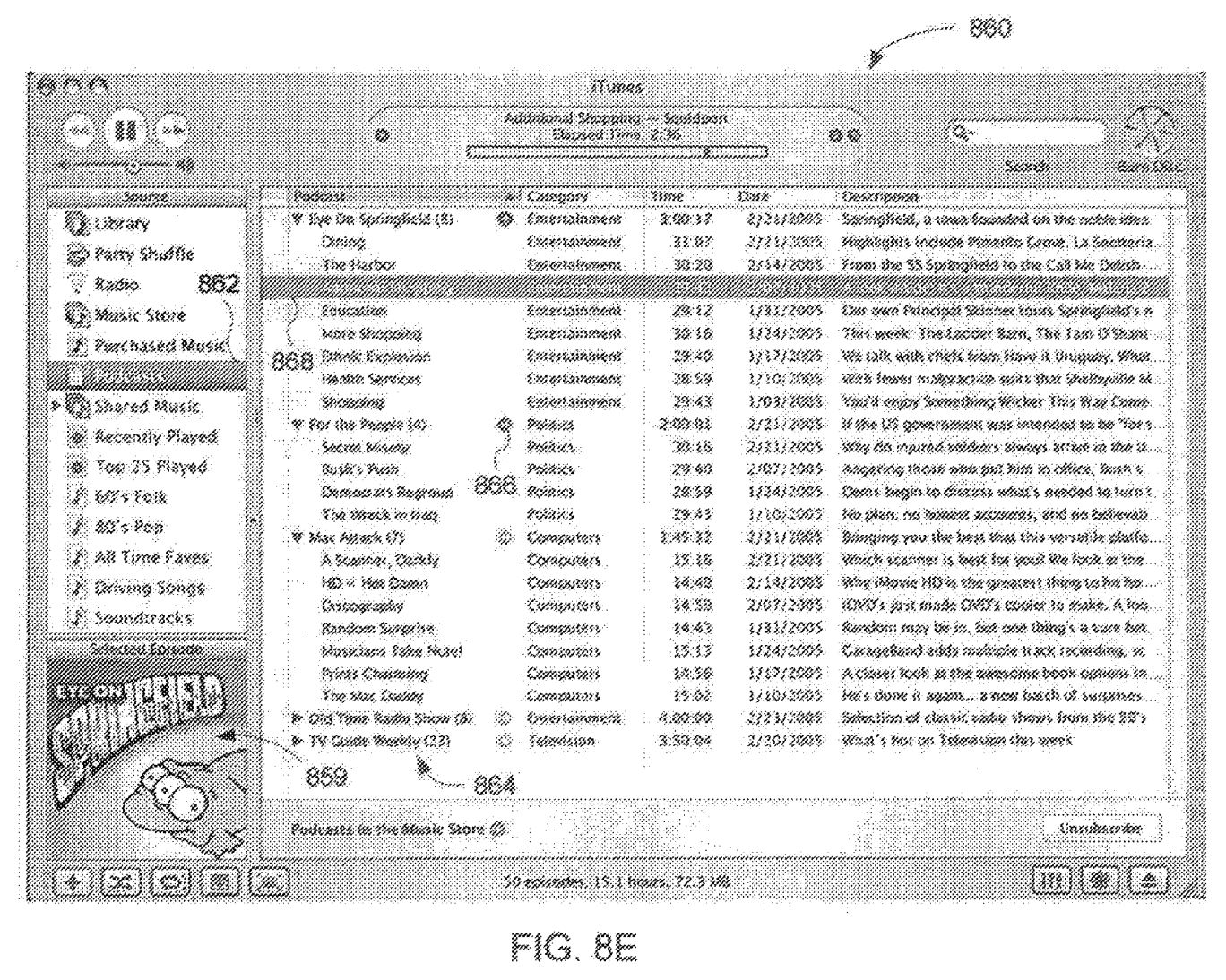

FIG. 8E is a screenshot of a podcast availability page 860 according to one exemplary embodiment of the invention. The podcast availability pane 860 includes an indicator 862 that indicates that podcasts are to be listed in a media asset list 864. The podcasts are listed in the media asset list 864 can include sublistings of episodes. These podcasts listed in the media asset list 864 are resident on a client device. Typically, these podcasts were previously downloaded from the appropriate hosting server to the client device. Indicators 866 can be used to visually identify those of the podcasts being listed that are available from the on-line media store. For example, the indicators 866 can identify those podcasts that are hosted on the on-line media store. By selecting any of the episodes, the associated audio can be played for the user. A selector 868 indicates that the episode entitle "Additional Shopping" is being played for the user, with the associated artwork 869 of the podcast, episode or chapter being displayed.

Figure 8F:
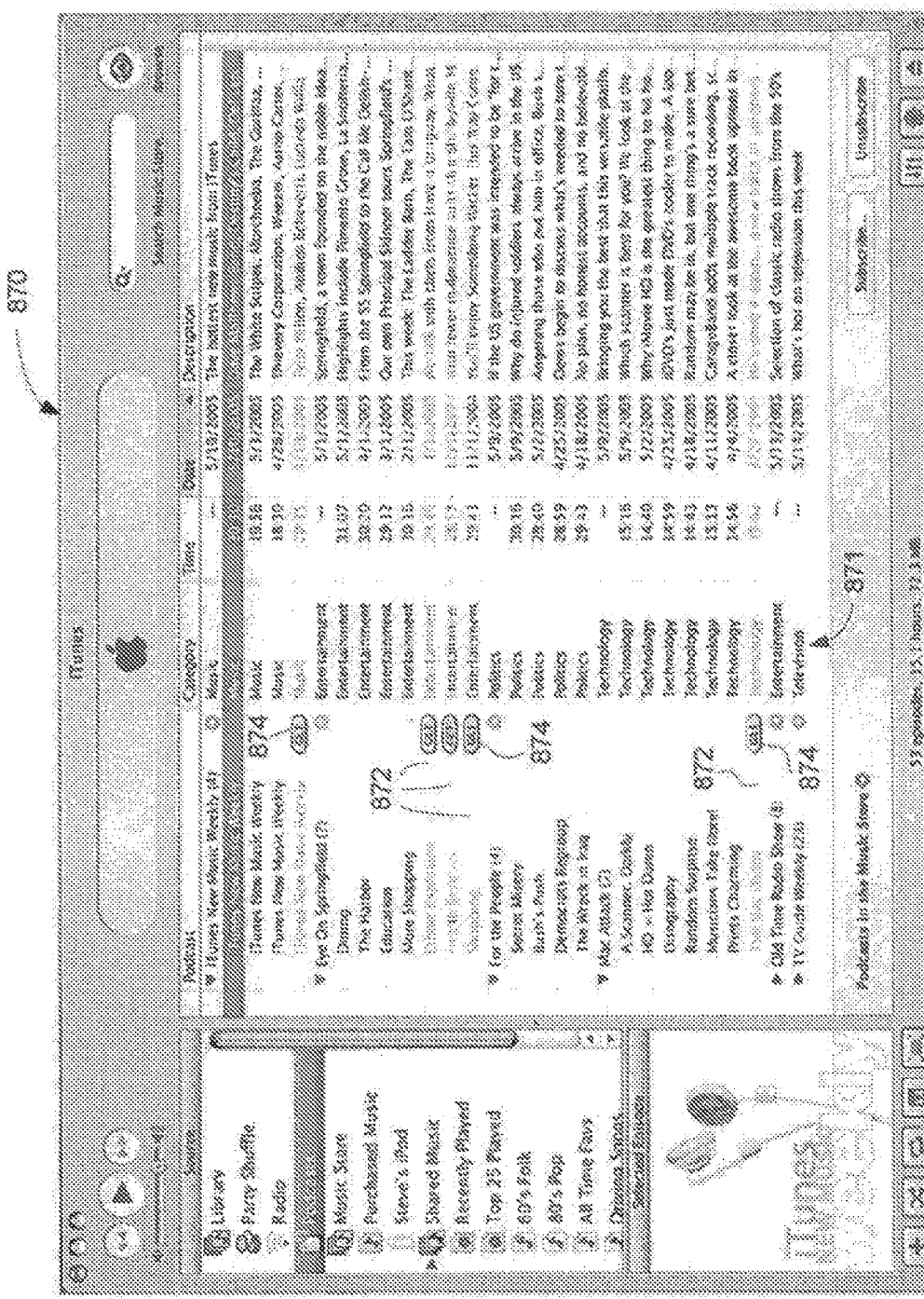
FIG. 8F is a screenshot of a podcast availability page according to another exemplary embodiment of the invention.

FIG. 8F is a screenshot of a podcast availability page 870 according to another exemplary embodiment of the invention. The podcast availability page 870 includes a media asset list 871 similar to the media asset list 864 of FIG. 8E. In this example, the media asset list includes episodes 872 that are not able to be played because the episode data has not been downloaded to the client device. In this example, these episodes 872 are shown highlighted and with "Get"

buttons 874. On selection of a "Get" button 874, the corresponding episode 872 would be acquired from the appropriate hosting server.

In general, when listing of podcasts provided by the media store or available locally via a client machine, the listing can be organized in a variety of different ways. One example of a listing organization is to sort the podcasts in accordance with ratings. For additional information on use of ratings with respect to a media store, see (i) U.S. patent application Ser. No. 11/114,914, filed Apr. 25, 2005, and entitled "PUBLISHING, BROWSING, RATING AND PURCHASING OF GROUPS OF MEDIA ITEMS"; and U.S. Pat. No. 7,860,830, issued Dec. 28, 2010, and entitled "PUBLISHING, BROWSING AND PURCHASING OF GROUPS OF MEDIA ITEMS."

Figure 8G:
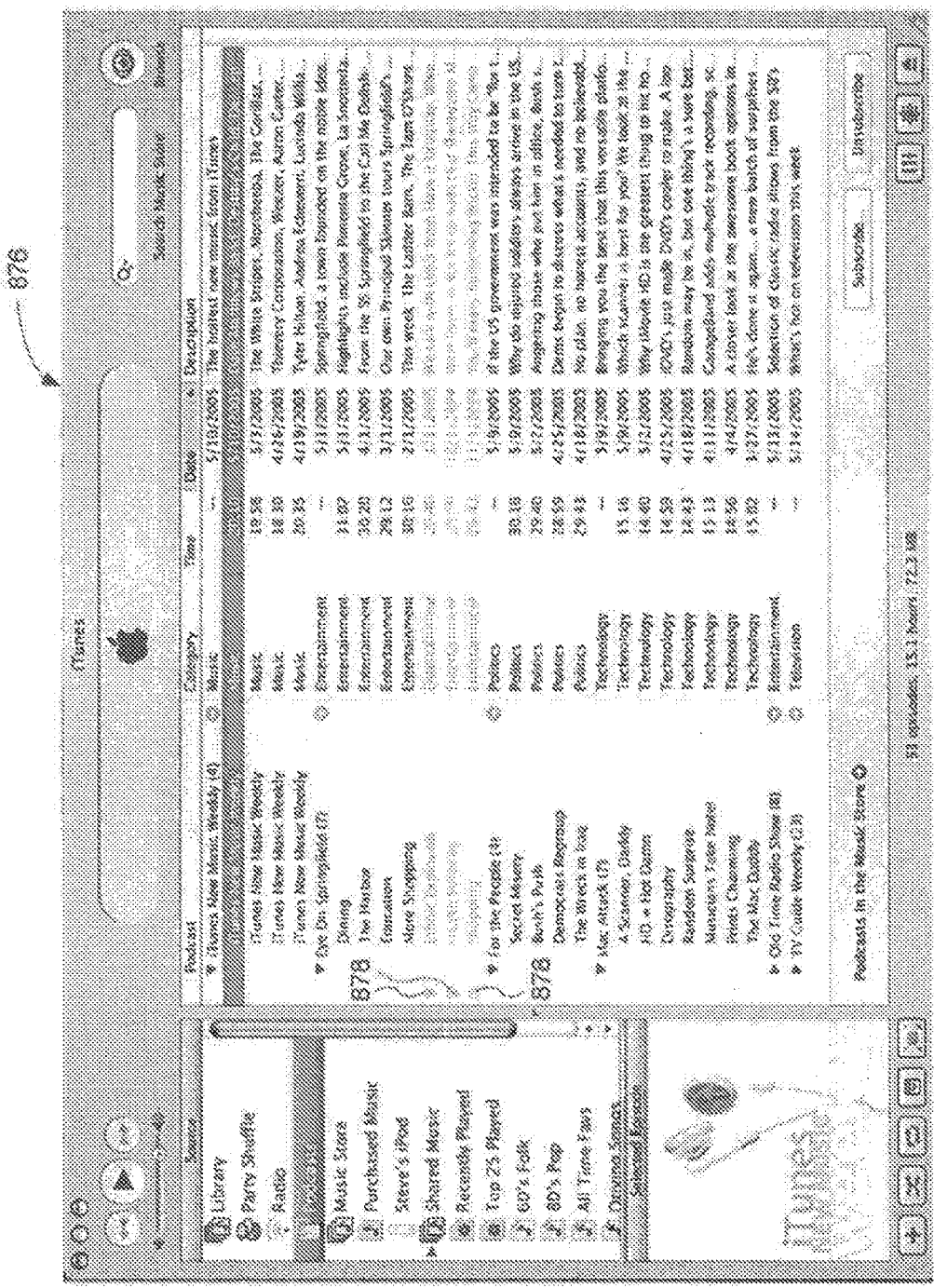
FIG. 8G is a screenshot of a podcast availability page according to another exemplary embodiment of the invention.

FIG. 8G is a screenshot of a podcast availability page 876 according to another exemplary embodiment of the invention. The podcasts listed in the podcast availability page 876 are similar to those listed the podcast availability page 870 illustrated in FIG. 8F. The podcast availability page 876 illustrates indicators 878 that visually identify those episodes of a podcast that in the process of being downloaded to the client device. Here, the episodes being downloaded are listed as existing but not yet present on the client device. Once the download of these episodes begins, the indicators 878 are displayed. After the episodes have been downloaded, the indicators 878 as well as any highlighting are removed.

As noted above, following initial subscription to a podcast, the podcast needs to be updated to acquire new episodes. To provide efficiency and intelligence in the manner of seeking such updates, the client (e.g., media management application) can use preference settings to bias or determine when updates are to be performed. These preference settings can be provided for all podcasts globally or on an individual podcast basis. For example, preference settings can indicate to check for new episodes periodically (e.g., hourly, daily, weekly) or whenever the client is launched.

Once the episodes of the podcasts have been stored, at the client device, some or all of the episodes can be copied to a portable media player that can operatively connect to the client device. To provide efficiency and intelligence in the manner of performing such copying (also known as synchronization), the client (e.g., media management application) can use preference settings to bias or determine when copying is to be performed (namely, automatically performed). These preference settings can be provided for all podcasts globally or on an individual podcast basis. The preferences can vary with implementation. Some examples of preferences include: (1) remove episode after it has been listened to on client device, (2) remove episode after it has been listened to on portable media device, (3) retain/download n most recent episodes, (4) retain/download up to n episodes, and (5) retain/download based on dates.

In one exemplary embodiment, a synchronization preference screen can be available to a user. The synchronization preference screen enables a user to set certain synchronization preferences for copying updates to podcasts from a client device to a portable media device. In particular, as an example, a user can choose to: (1) automatically update all podcasts, (2) automatically update only selected podcasts, (3) manually manage podcasts (i.e., no automatic updating), and (4) delete podcasts from the portable media player after they have been played. Other criteria (not shown) that could be used includes download up to n episodes and/or download only those of the episodes not yet listened to. For example, if a particular episode was listened to at the client device, it is likely that the user may not want to download that episode to the portable media device.

Note that by deleting those podcasts that have been listened to from the portable media player, the portable media player can maintain only those of the podcast episodes that the user has not yet listened to. Here, the removal of the episodes that have been played is automatic. In one embodiment, an episode can be deemed played if substantially all of the podcast episode has been played. For example, an episode can be deemed as having been played if 95% of the episode has been played.

Another aspect of the invention pertains to improved approaches to enable subscription to podcasts. In one embodiment, small, portable electronic files referred to as podcast subscription files can be used to facilitate easy subscription to podcasts. Indeed, in one implementation, by simply selecting or opening a podcast subscription file (e.g., double-clicking on it), subscription can be completely carried out in an automated manner.

Figure 9:
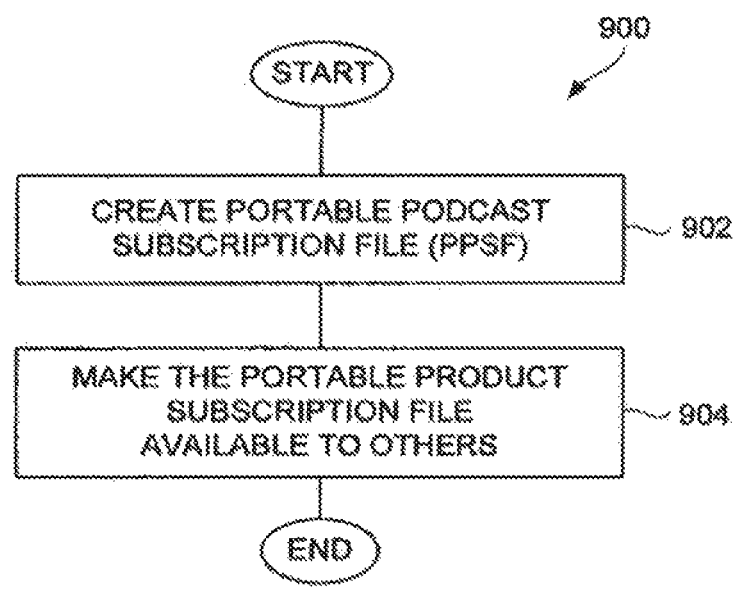
FIG. 9 is a flow diagram of a podcast subscription file creation process according to one embodiment of the invention.

FIG. 9 is a flow diagram of a podcast subscription file creation process 900 according to one embodiment of the invention. The podcast subscription file creation process 900 is, for example, performed by a client (client program), such as media management application. The podcast subscription file creation process 900 initially creates 902 a portable podcast subscription file. The portable podcast subscription file is an electronic file that contains information that facilitates subscription to a podcast. After the portable podcast subscription has been created 902, the portable podcast subscription file is made 904 available to others. The portable podcast subscription file can thereafter distributed, as desired, and then used to facilitate subscribing to the podcast.

In one embodiment, the portable podcast subscription file is an XML document (or other markup language type document) that includes podcast information that facilitates subscription to the podcast. As an example, the podcast information within the XML document includes at least a feed URL for the podcast feed. Additionally, the podcast information may include other descriptive information concerning the podcast, as title and description. A representative example of a portable podcast subscription file is as follows:

```
<feed xmlns:it="http://www.itunes.com/ext/chapters/1.0>
    <link rel="feed" href="itpc://foo.com/podcasts/myfeed.xml" />
    <title>My Podcast</title>
    <description>I talk about random things.</description >
</feed>
```

Note that the link named "feed" is associated with a URL (feed URL) that points to a podcast feed (e.g., "myfeed"). This portable podcast subscription file also includes a title ("My Podcast") and a description ("I talk about random things") for the associated podcast. The XML format is a markup language format using tags to distinguish the different data items within the document.

Figure 10:
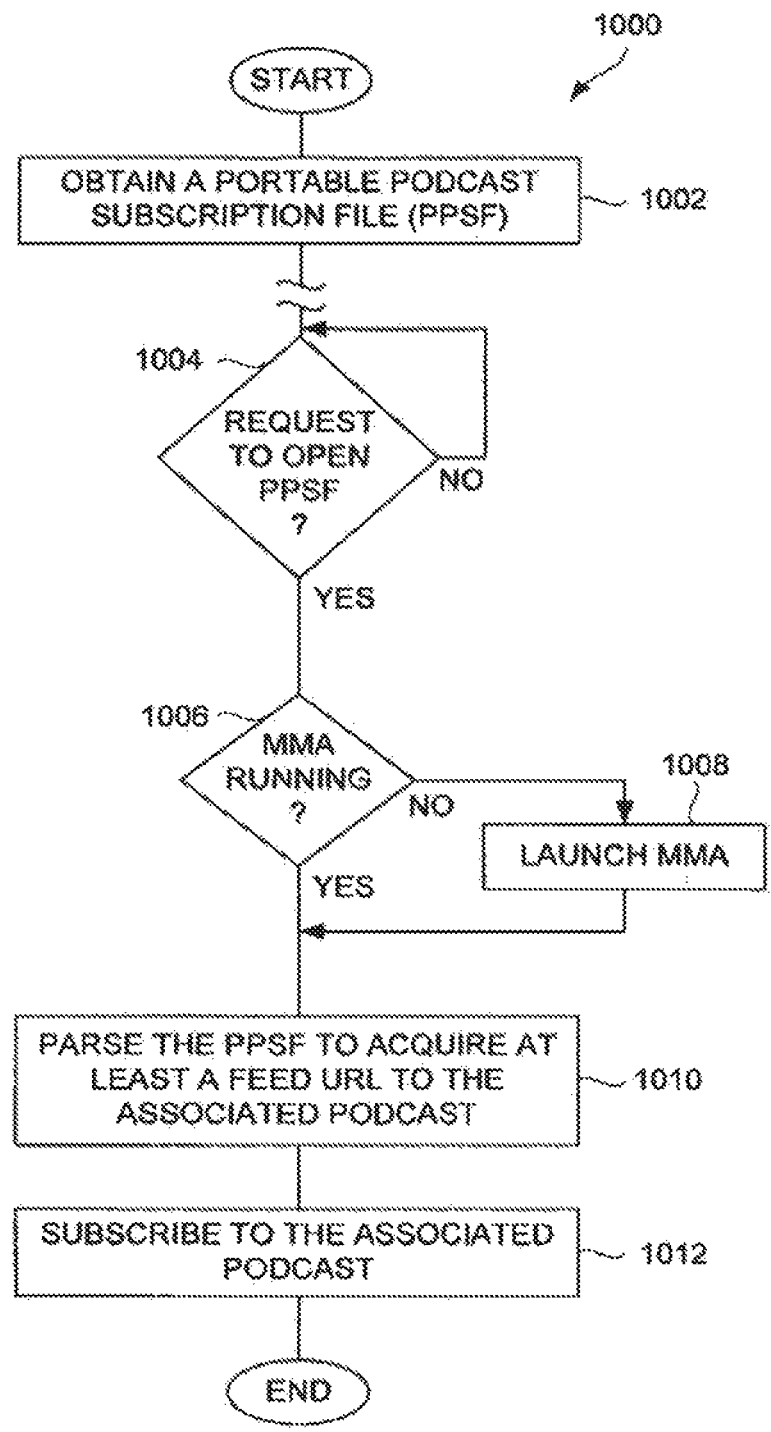
FIG. 10 is a flow diagram of a podcast subscription file usage process according to one embodiment of the invention.

FIG. 10 is a flow diagram of a podcast subscription file usage process 1000 according to one embodiment of the invention. The podcast subscription file usage process 1000 is, for example, performed by a client, such as a media management application, operating on a client device.

The podcast subscription file usage process 1000 initially obtains 1002 a portable podcast subscription file (PPSF). The portable podcast subscription file can be obtained 1000 in advance of other processing performed by the podcast subscription file usage process. That is, a decision 1004 determines whether a request to open the portable podcast subscription file has been made. For example, the request to open can signal an OpenURL event. When the decision 1004 determines that a request to open a portable podcast subscription file has not been made, the podcast subscription file usage process 1000 simply awaits such a request.

Once the decision 1004 determines that a request to open a portable podcast subscription file has been made, a decision 1006 determines whether a media management application (MMA) is running. Typically, the media management application would be running on a client device. When the decision 1006 determines that the media management application is not currently running, then the media management application is launched 1008. Following the block 1008, or following the decision 1006 when the media management application is determined to be running, the portable podcast subscription file is parsed 1010 to acquire at least a feed URL to the associated podcast. In one implementation, the request to open the portable podcast subscription file can be a URL scheme ("itpc" or "pcast") that is recognized by the media management application as an XML document to be parsed and used to subscribe to a podcast.

Next, the podcast subscription file usage process 1000 subscribes 1012 to the associated podcast. The subscription 1012 to the associated podcast can be automatically performed without any feedback or input from a user of the media management application. However, if desired, additional processing can be performed to display descriptive information concerning the podcast and/or to query the user as to whether they want to subscribe. In other words, the user can confirm that they desire to subscribe to the associated podcast and/or the user can receive additional information concerning the podcast (e.g., title, description, etc.) for which they are about to subscribe. Regardless, following the block 1012, the podcast subscription file usage process 1000 ends.

Figure 11:
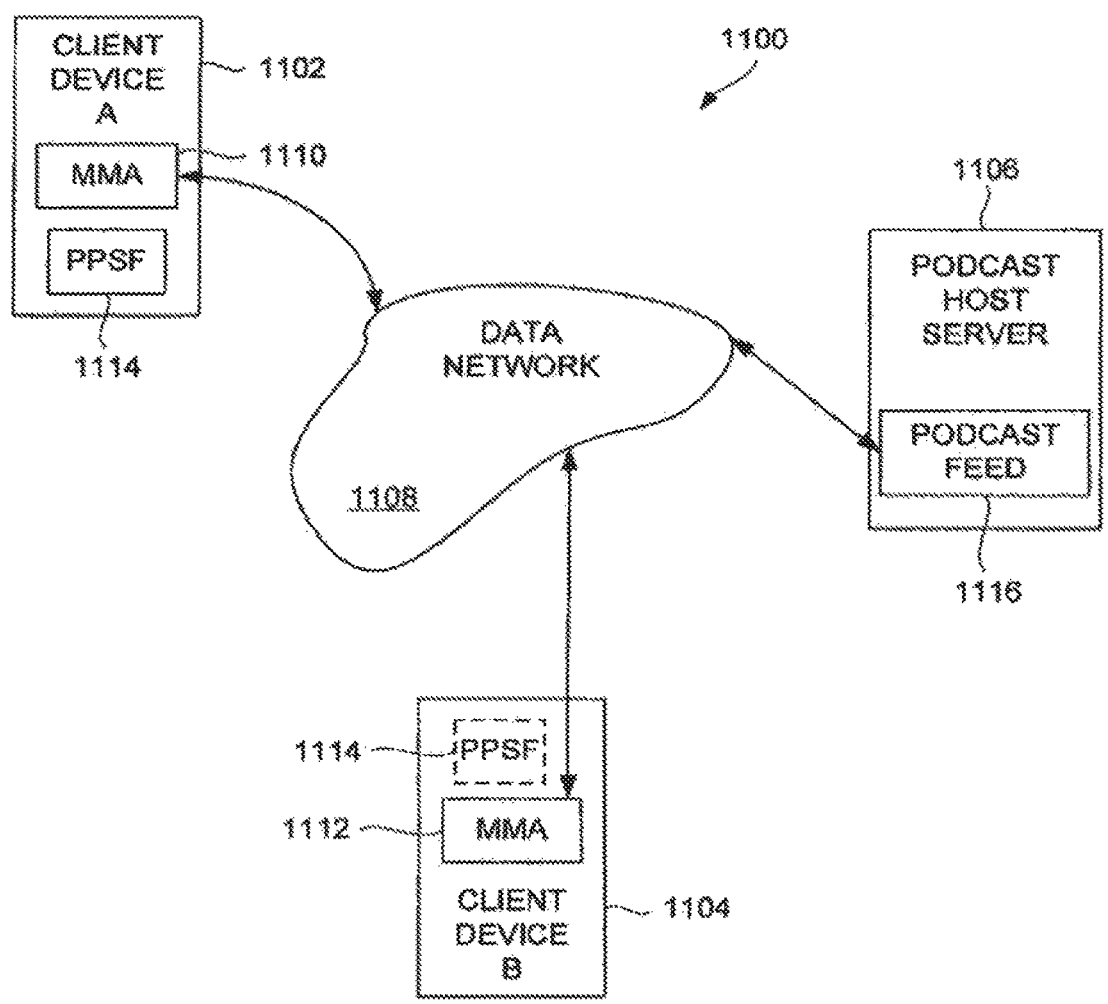
FIG. 11 is a podcast subscription system according to one embodiment of the invention.

FIG. 11 is a podcast subscription system 1100 according to one embodiment of the invention. The podcast subscription system 1100 includes a client device A 1102, a client device B 1104, and a podcast host server 1106, each of which operatively connects to a data network 1008. The client device A 1102 includes a media management application (MMA) 1110, and the client device B 1104 includes a media management application (MMA) 1112. The client device A 1102 creates or otherwise acquires a portable podcast subscription file 1114. The portable podcast subscription file 1114 can be transferred to one or more other client devices. In this example, the portable podcast subscription file 1114 can be assumed to be created by the media management application 1110.

Once the media management application 1110 has the portable podcast subscription file, the media management application 1110 can transfer the portable podcast subscription file 1114 through the data network 1108. In this example, it is assumed that the portable podcast subscription file 1114 is transferred through the data network 1108 to that media management application 1112 of the client device B, 1104. Hence, as shown in FIG. 11, the portable podcast subscription file 1114 is shown in a dashed box within the client device B, 1104.

Thereafter, the media management application 1112 of the client device B 1104 can utilize the portable podcast subscription file 1114 to subscribe to an associated podcast. More particularly, if a user of the client device B 1104 were to "open" the portable podcast subscription file 1114, such as by a double-click action, the media management application 1112 would process the "open" request as it request to subscribe the media management application 1112 to the podcast. In this example, the podcast resides on the podcast host server 1106. In particular, the portable podcast subscription file 1114 would be parsed by the media management application 1112 to obtain a feed URL to a podcast feed 1116 for the podcast which reside on the podcast host server 1106. The media management application 1112 can then access the podcast feed 1116 to acquire and then store certain podcast information at the client device B 1104.

It should be understood that, in general, a portable podcast subscription file (e.g., a portable podcast subscription file 1114) can be transferred to one or more other client devices in a variety of different ways. For example, the portable podcast subscription file can be sent via an electronic-mail message to a user associated with a client device. The user can then open the portable podcast subscription file to activate the subscription to the podcast. In another example, the portable podcast subscription file can be associated with a link on a web page. Then, when a user at the web site selects the link associated with a web page, the portable podcast subscription file can be downloaded to the client device associated with the user and then processed by the media management application subscribe to the podcast. In still another example, the portable podcast subscription file can be transferred by a portable computer readable medium, such as a flash memory card on a floppy disk, or compact disc.

Another aspect of the invention pertains to deactivating subscriptions to podcasts. More particularly, this aspect of the invention deactivates subscriptions that are deemed inactive. In one embodiment, the deactivation process can be automatically performed. One advantage of deactivating subscriptions that are deemed inactive is that network bandwidth can be conserved. Another advantage of deactivating subscriptions that are deemed inactive can be that a host server hosting the podcast is not burdened with download requests from client applications whose users having little or no interest in the podcast.

Figure 12:
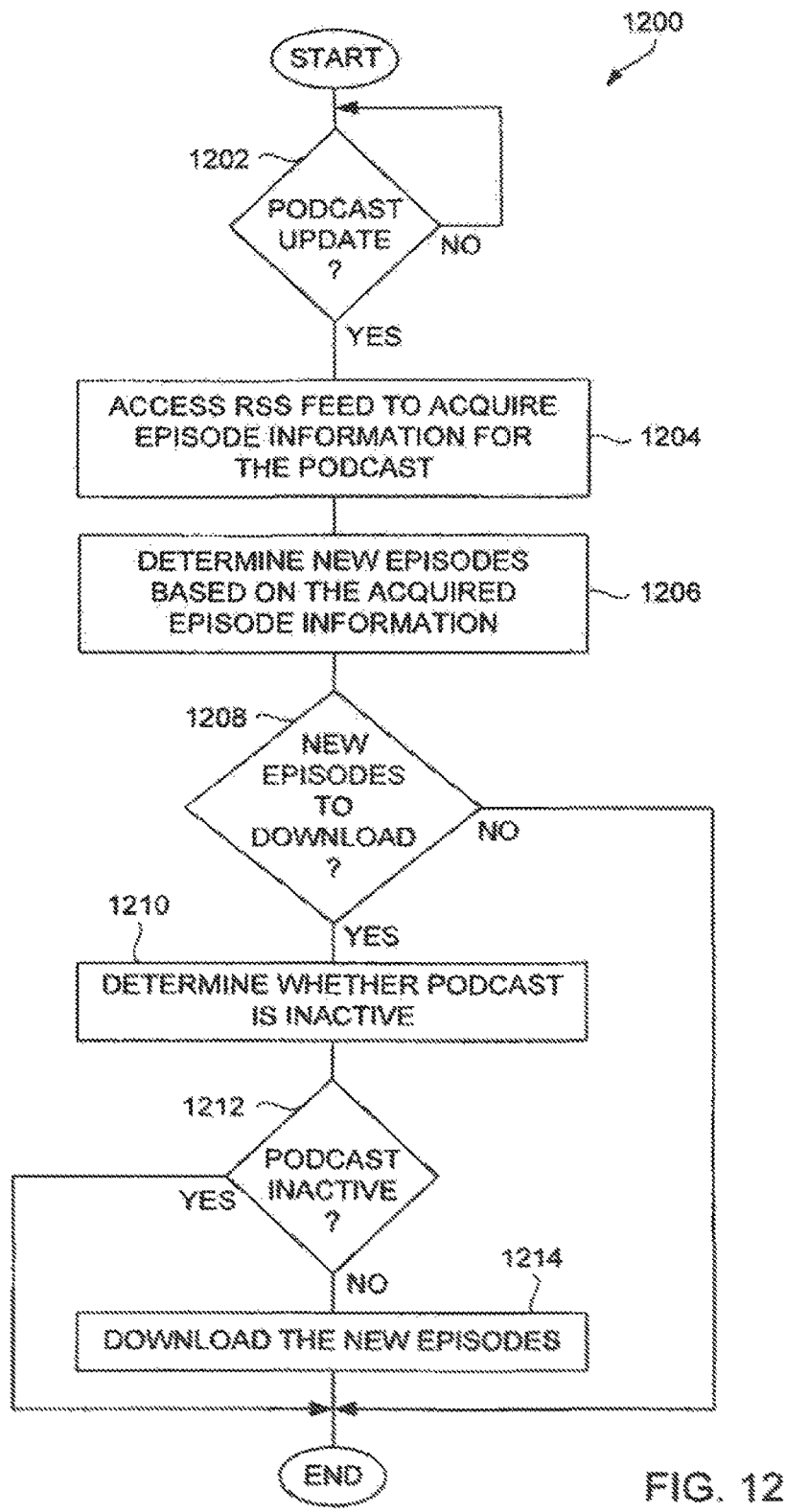
FIG. 12 is a flow diagram of a podcast update process according to one embodiment of the invention.

FIG. 12 is a flow diagram of a podcast update process 1200 according to one embodiment of the invention. The podcast update process 1200 is, for example, performed by a client, such as a media management application.

The podcast update process 1200 begins with a decision 1202 that determines whether a podcast update is to be performed. When the decision 1202 determines that a podcast update is to not be performed, then the podcast update process 1200 waits until a podcast update is to be performed. In other words, the podcast update process 1200 is effectively invoked when a podcast update is to be performed. A podcast update can be requested by a client or a user of the client. For example, the client might periodically automatically initiate a podcast update.

On the other hand, when the decision 1202 determines that a podcast update is to be performed, then a podcast feed (e.g., RSS feed) for a particular podcast is accessed 1204 to acquire episode information for the podcast. Then, new episodes for the podcast are determined 1206 based on the acquired episode information. In one implementation, the acquired episode information is an XML file that contains metadata describing characteristics of the particular podcast, including the various episodes of the podcast. The XML file can be parsed to obtain episode information (e.g., episode metadata). An examination of the episode information can serve to identify the new episodes of the podcast as compared to those episodes that are either older in time or already previously made available at the client.

Next, a decision 1208 determines whether there are new episodes of the podcast to download. Here, the new episodes are available from the host server for the podcast and are thus available to be downloaded to the client. When the decision 1208 determines that there are new episodes to be downloaded, the podcast update process 1200 determines 1210 whether the podcast is inactive. When the decision 1212 determines that the podcast is not inactive, then the new episodes are downloaded 1214 to the client. After the new episodes have been downloaded 1214, the podcast update process 1200 is complete and ends with the client having received a podcast update. On the other hand, when the decision 1208 determines that there are no new episodes to download, or when the decision 1212 determines that the podcast is inactive, then the podcast update process 1200 is complete and ends without having downloaded any new episodes.

Figure 13:
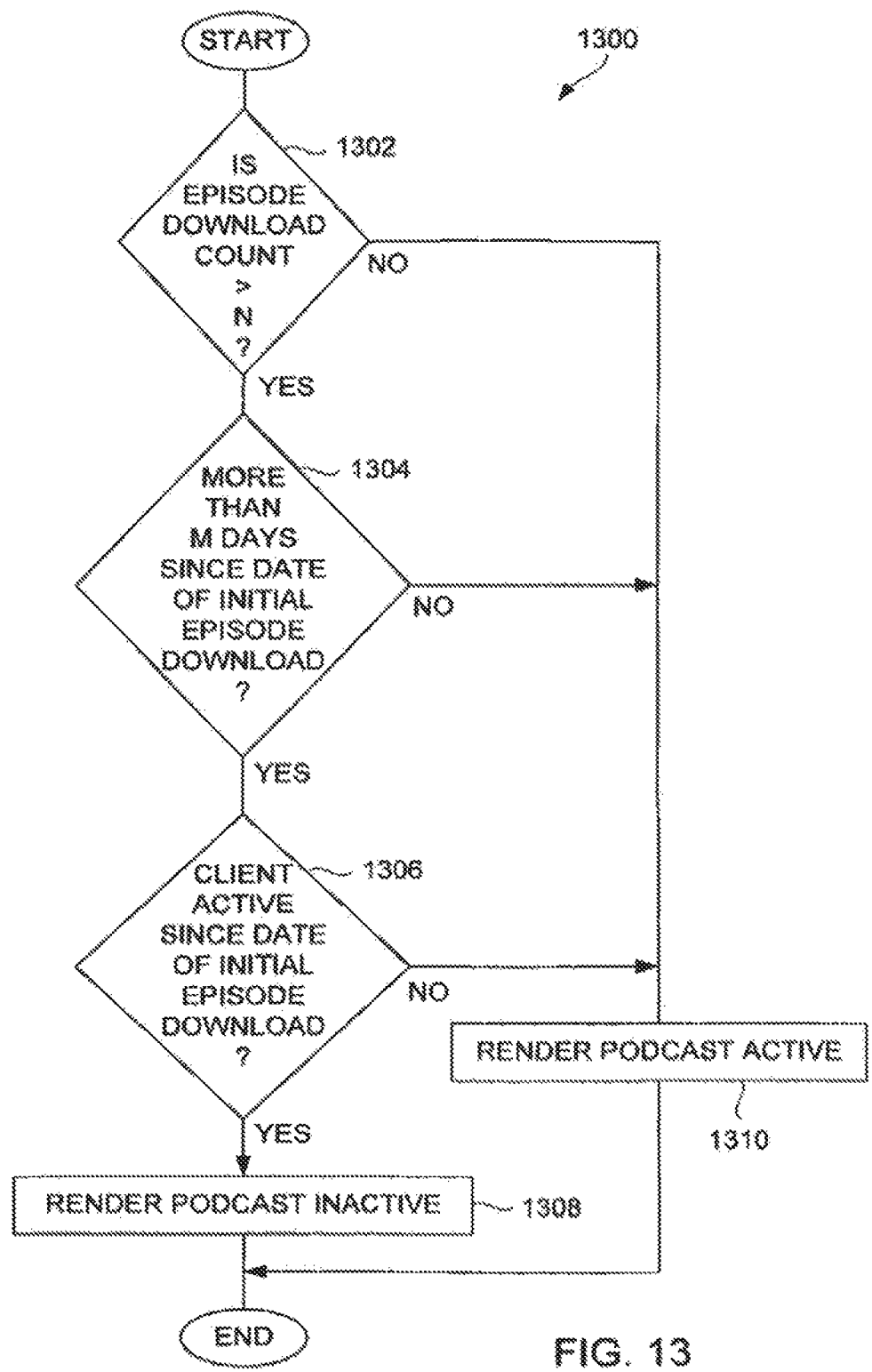
FIG. 13 is a flow diagram of a podcast activity process according to one embodiment of the invention.

FIG. 13 is a flow diagram of a podcast activity process 1300 according to one embodiment of the invention. The podcast activity process 1300 is generally utilized to determine whether a podcast is either active or inactive. As an example, the podcast activity process 1300 can be utilized as the processing performed by the determination 1210 illustrated in FIG. 12, according to one embodiment of the invention. In this embodiment, at least a pair of variables is maintained for each podcast (that has been subscribed to) to facilitate the determination of whether the podcast is active or inactive. In this exemplary embodiment, the variables are an episode download count and a date of initial episode download.

The podcast activity process 1300 begins with a decision 1302 that determines whether an episode download count is greater than an integer N. When the decision 1302 determines that the episode download count is greater than N, a decision 1304 determines whether more than M days have passed since the date of initial episode download, where M is an integer. For example, the integers M and N can equal five (5). When the decision 1304 determines that more than M days have passed since the date of the initial episode download, a decision 1306 determines whether the client has been active since the date of initial episode download. When the decision 1306 determines that the client has been active since the date of initial episode download, the podcast is rendered 1308 inactive. Here, in this embodiment, the podcast is rendered 1308 inactive because the podcast activity process 1300 has programmatically determined that there has been insufficient activity with respect to the podcast. Consequently, it is presumed that the user of the client has little or no interest in the podcast. As a result, the download 1214 of new episodes by the podcast update process 1200 of FIG. 12 is bypassed, thereby conserving network and server resources.

On the other hand, when the decision 1302 determines that the episode download count is not greater than N, or when the decision 1304 determines that there are not more than M days since the date of the initial episode download, or when the decision 1306 determines that the client has not been active since the data initial episode download, then the podcast is rendered 1310 active. Following the blocks 1308 and 1310, the podcast activity process 1300 is complete and ends.

Figure 14:
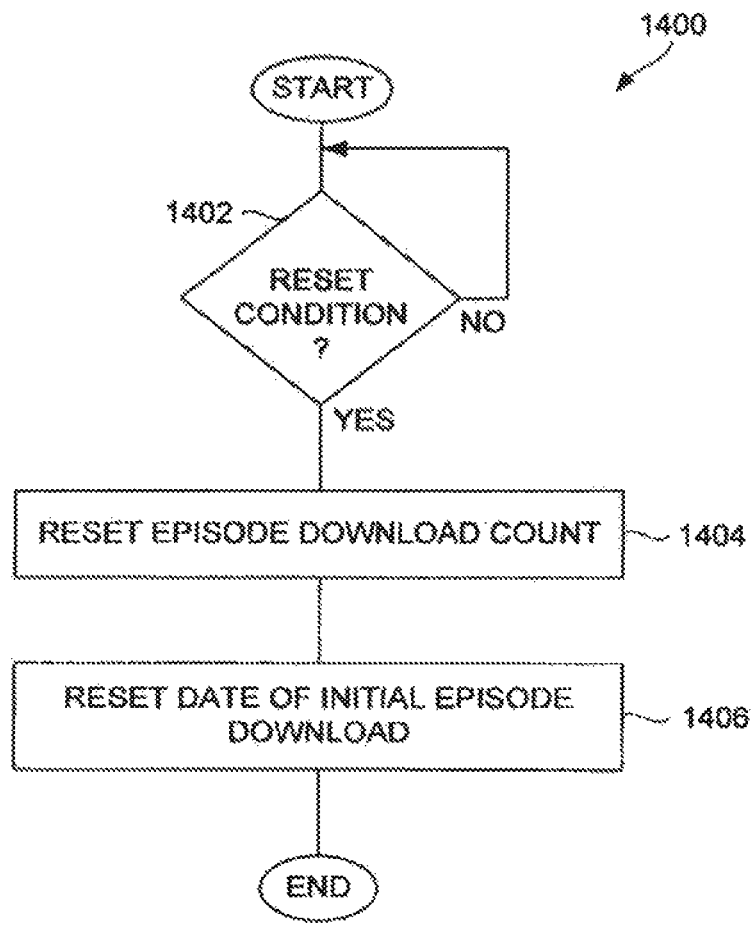
FIG. 14 is a flow diagram of a reset activity variables process according to one embodiment of the invention.

FIG. 14 is a flow diagram of a reset activity variables process 1400 according to one embodiment of the invention. The reset activity variables process 1400 is, for example, performed by the client operating on a client device. The client operates to reset activity variables at appropriate times during its operation so as to impact the podcast activity process 1300 described above with respect FIG. 13. In other words, at certain times, the activity variables utilized by the podcast activity process 1300 can be reset to affect the operation of the podcast activity process 1300. For example, the activity variables being reset can include an episode download count or a date of initial episode download. Note that these reset variables can directly affect the decisions 1302, 1304 and 1306 of the podcast activity process 1300.

The reset activity variables process 1400 begins with a decision 1402 that determines whether a reset condition has been established. The reset condition can be established in a variety of different ways. The reset condition can be initiated automatically or by a user. In any case, when the decision 1402 determines that a reset condition does not exist, then the recent activity variables processed 1400 awaits such a condition. In other words, the reset activity variables processed 1400 begins when an appropriate reset condition has been reached. Once the decision 1402 determines that the appropriate reset condition has been reached, the episode download count is reset 1404. Here, the episode download count can be reset 1404 to zero. In addition, the date of initial episode download is reset 1406. Here, the date of the initial episode can be reset 1404 to the current date. Following the block 1406, the reset activity variables process 1400 is complete and ends.

Although the reset condition can be established in a variety of ways, when programmatically or user initiated, events occurring on the client can cause the reset condition. In general, the reset condition is programmatically triggered when the client understands the client, or the user of the client, to have expressed interest in the podcast. Examples of events that express an interest in the podcast are: (1) user plays an episode of the podcast, (2) client (or portable media player) completes playing of an episode of the podcast, and (3) user downloads an episode of the podcast.

Another aspect of the invention pertains to chapter enhancements podcasts. The chapter enhancements can provide an improved user interface for use with podcasts. The chapter enhancements are enabled by podcasts containing chapter information. For example, the chapter information can be displayed in various ways to enhance the playback experience.

The chapter information can include, but is not limited to: title, picture, url, description (e.g., in rich text, including embedded links), movies (audio & video), artist, album, and podcast subscriptions. All chapter information is optional— e.g., some chapters may have titles and pictures and other chapters may only have a title.

Podcasts can carry chapter information either embedded in the file (e.g., XML file) or carried in the podcast feed.

To embed chapter information into a file, a m4a file format can be extended to support the additional chapter information. The track information is formatted according to ISO file formats. A track, marked as a chapter track, can contain the chapter information. The tracks can be name tracks, url tracks, picture tracks, description tracks, or other metadata tracks. At the start of any of the chapters, the chapter information included within the user interface can be changed so as to correspond with the chapter.

To provide chapter information in the podcast feed, the podcasts, namely the RSS feeds for podcasts, can be enhanced to include chapter related information. This chapter related information can be specified by newly specified XML elements, (e.g., chapter tags). A client application, e.g., media management application, that understands these XML elements can retrieve the chapter related information from RSS feeds and thus provide an enhanced user interface at a client device for a portable media device associated with the client device). The chapter related information can be text, audio, images and/or video. In the event that the client application does not understand the newly specified chapter elements, the RSS feed is still otherwise useable, though without the user interface enhancements.

In one embodiment, the newly specified XML elements are: (i) a segment element which acts as a container element signaling a segment (i.e., chapter); and (ii) a link element—one or more of these defining multimedia elements (pictures, auxiliary audio, auxiliary video) associated with the segment. Each segment can have a start time, title, and URL to a multimedia element. For example, at the start time, the title and multimedia element are displayed. Each segment can also contain other metadata for the segments of the podcast (e.g., author, track, related URL link).

An exemplary RSS feed with three (3) chapters is:

```
<segment xmlns:it="http://www.itunes.com/ext/chapters/1.0>
    <it:starttime>0</it:starttime>
    <it:title>Introduction</it:title>
    <it:link rel="enclosure" type="video/JPEG"
href="http://foo.com/chapter1picture.jpg" />
    <it:link rel="related"
    href="http://foo.com/infoAboutChapter1.html" />
</segment>
<segment xmlns="http://www.itunes.com/ext/podcasts/1.0>
    <it:starttime>0:30</it:starttime>
    <it:title>Music segment one</it:title>
    <it:link rel="enclosure" type="video/JPEG"
href="http://foo.com/chapter2picture.jpg" />
    <it:link rel="related"
    href="http://foo.com/infoAboutChapter2.html" />
    <it:author>Some Great Band</it:author>
    <it:track>My Great Hit</it:track>
</segment>
<segment xmlns="http://www.itunes.com/ext/podcasts/1.0>
    <it:starttime>0:30</it:starttime>
    <it:title>Music segment one</it:title>
    <it:link rel="enclosure" type="video/JPEG"
href= "http://foo.com/chapter2picture.jpg" />
    <it:link rel="related"
    href="http://foo.com/infoAboutChapter2.html" />
    <it:link rel="feed" href="itpc://foo.com/podcasts/myfeed.xml" />
    <it:author>Some Great Band</it:author>
    <it:track>My Great Hit</it:track>
</segment>
```

The user interface enhancements (for a client application or portable media device) facilitated by the existence of chapter information can include any of the following example. As one example, a chapter picture can be shown as related to the chapter of the podcast. As the podcast is played, the chapter picture automatically changes to correspond to the current chapter. The chapter picture may also change as the user jumps (e.g., scrubs) from chapter to chapter when navigating through the chapters. An another example, when a user selects a popup menu to select a chapter, each menu item in the popup menu contains a chapter title and also a thumbnail of the chapter picture. As still another example, when a user selects (e.g., clicks on) a chapter picture, the client application links (hyperlinks) to a chapter URL. In yet another example, the chapter information can vary as the chapter changes. Here, chapter artist, show, description and other information can be displayed in various parts of the user interface such that it can changes as the chapter changes. In still yet another example, a subscription link can be utilized as chapter information. If the subscription link is selected, the client application will automatically subscribe to the podcast feed. In one embodiment, the subscription link can point to a portable subscription.

Although the media assets (or media items) of emphasis in several of the above embodiments were podcasts, which include audio items (e.g., audio files or audio tracks), the media assets are not limited to audio items. For example, the media assets can alternatively pertain to videos (e.g., movies) or images (e.g., photos). More generally, podcasts can also be referred to as digital multimedia assets.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method performed by one or more computers, the method comprising:
    transmitting data that causes a first computing device to provide a user interface that invokes a text entry portion to receive a registration of a podcast;
    receiving, at a second computing device, an identifier of a source of the podcast;
    verifying the identifier; and
    in response to a request for the podcast, causing transmission of the podcast to the second computing device.

2. The method of claim 1, wherein verifying the identifier comprises causing a verification email message to be sent to an email address associated with the source of the podcast and receiving a confirmation email in response to the verification email message.

3. The method of claim 1, comprising:
    providing an option to subscribe to a podcast via the user interface.

4. The method of claim 1, comprising:
    providing an option to subscribe to a podcast by invocation of one or more screen item selections.

5. The method of claim 1, comprising:
    providing an option to subscribe to a podcast by invocation of one or more screen item selections; and
    causing transmission of content of the subscribed podcast to the first computing device.

6. The method of claim 1, comprising
    receiving an indication a podcast is marked as including explicit content; and
    storing an association of explicit content for the podcast marked as including explicit content.

7. The method of claim 1, comprising
    causing the first computing device to display an indication of whether the podcast is downloaded.

8. The method of claim 1, comprising:
transmitting to the first computing device instructions to cause display podcasts titles arranged according to an order, the order selected from: category, length, date published.

9. At least one non-transitory computer-readable storage medium storing instructions, that when executed, cause one or more processors to perform operations comprising:
transmitting data that causes a first computing device to provide a user interface that invokes a text entry portion to receive a registration of a podcast;
receiving, at a second computing device, an identifier of a source of the podcast;
verifying the identifier; and
in response to a request for the podcast, causing transmission of the podcast to the second computing device.

10. The computer-readable storage medium of claim 9, wherein verifying the identifier comprising causing a verification email message to be sent to an email address associated with the source of the podcast and receiving a confirmation email in response to the verification email message.

11. The computer-readable storage medium of claim 9, the operations comprising:
providing an option to subscribe to a podcast via the user interface.

12. The computer-readable storage medium of claim 9, the operations comprising:
providing an option to subscribe to a podcast by invocation of one or more screen item selections.

13. The computer-readable storage medium of claim 9, the operations comprising:
providing an option to subscribe to a podcast by invocation of one or more screen item selections; and
causing transmission of content of the subscribed podcast to the first computing device.

14. The computer-readable storage medium of claim 9, the operations comprising
receiving an indication a podcast is marked as including explicit content; and
storing an association of explicit content for the podcast marked as including explicit content.

15. The computer-readable storage medium of claim 9, the operations comprising
causing the first computing device to display an indication of whether the podcast is downloaded.

16. The computer-readable storage medium of claim 9, the operations comprising:
transmitting to the first computing device instructions to cause display podcasts titles arranged according to an order, the order selected from: category, length, date published.

17. A system comprising:
at least one memory;
one or more processors;
at least one non-transitory computer-readable storage medium storing instructions, that when executed by the one or more processors, cause the one or more processors to perform operations comprising:
transmitting data that causes a first computing device to provide a user interface that invokes a text entry portion to receive a registration of a podcast;
receiving, at a second computing device, an identifier of a source of the podcast;
verifying the identifier; and
in response to a request for the podcast, causing transmission of the podcast to the second computing device.

18. The system of claim 17, wherein verifying the identifier comprising causing a verification email message to be sent to an email address associated with the source of the podcast and receiving a confirmation email in response to the verification email message.

19. The system of claim 17, the operations comprising:
providing an option to subscribe to a podcast via the user interface.

20. The system of claim 17, the operations comprising:
providing an option to subscribe to a podcast by invocation of one or more screen item selections.

21. The system of claim 17, the operations comprising:
providing an option to subscribe to a podcast by invocation of one or more screen item selections; and
causing transmission of content of the subscribed podcast to the first computing device.

22. The system of claim 17, the operations comprising
receiving an indication a podcast is marked as including explicit content; and
storing an association of explicit content for the podcast marked as including explicit content.

23. The system of claim 17, the operations comprising
causing the first computing device to display an indication of whether the podcast is downloaded.

24. The system of claim 17, the operations comprising:
transmitting to the first computing device instructions to cause display podcasts titles arranged according to an order, the order selected from: category, length, date published.

* * * * *

UNITED STATES PATENT AND TRADEMARK OFFICE
CERTIFICATE OF CORRECTION

| | |
|---|---|
| PATENT NO. | : 9,923,962 B2 |
| APPLICATION NO. | : 15/238342 |
| DATED | : March 20, 2018 |
| INVENTOR(S) | : Anne Jones et al. |

Page 1 of 1

It is certified that error appears in the above-identified patent and that said Letters Patent is hereby corrected as shown below:

In the Specification

Column 1, Line 9, delete "Aug. 16, 2015," and insert -- Aug. 6, 2015, --.

Signed and Sealed this
Twenty-sixth Day of February, 2019

Andrei Iancu
*Director of the United States Patent and Trademark Office*